US009096437B2

(12) United States Patent
Tour et al.

(10) Patent No.: US 9,096,437 B2
(45) Date of Patent: Aug. 4, 2015

(54) GROWTH OF GRAPHENE FILMS FROM NON-GASEOUS CARBON SOURCES

(75) Inventors: James Tour, Bellaire, TX (US); Zhengzong Sun, Houston, TX (US); Zheng Yan, Houston, TX (US); Gedeng Ruan, Houston, TX (US); Zhiwei Peng, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 241 days.

(21) Appl. No.: 13/561,889

(22) Filed: Jul. 30, 2012

(65) Prior Publication Data
US 2014/0234200 A1    Aug. 21, 2014

Related U.S. Application Data

(63) Continuation-in-part of application No. PCT/US2011/027575, filed on Mar. 8, 2011.

(60) Provisional application No. 61/311,615, filed on Mar. 8, 2010, provisional application No. 61/347,700, filed on May 24, 2010, provisional application No. 61/433,702, filed on Jan. 18, 2011, provisional application No. 61/513,300, filed on Jul. 29, 2011.

(51) Int. Cl.
*C01B 31/04* (2006.01)
*C01B 31/00* (2006.01)

(52) U.S. Cl.
CPC .......... *C01B 31/0446* (2013.01); *C01B 2204/02* (2013.01)

(58) Field of Classification Search
CPC    C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28
USPC ......................................................... 423/448
See application file for complete search history.

(56) References Cited

U.S. PATENT DOCUMENTS

| | | | |
|---|---|---|---|
| 5,399,936 | A | 3/1995 | Namiki |
| 2002/0130605 | A1 | 9/2002 | Mueller |
| 2003/0185741 | A1 | 10/2003 | Matyjaszewski |
| 2003/0193287 | A1 | 10/2003 | Sakamoto |
| 2005/0006623 | A1 | 1/2005 | Wong |
| 2005/0098204 | A1 | 5/2005 | Roscheisen |
| 2007/0224479 | A1 | 9/2007 | Tadokoro |

(Continued)

OTHER PUBLICATIONS

Scientific Background on the Nobel Prize in Physics 2010—GRAPHENE—complied by the Class for Physics of the Royal Swedish Academy of Sciences, pp. 1-10 (Oct. 5, 2010).*
Fitzer, et al., Recommended Terminology for the Description of Carbon as a Solid, Pure & Appl. Chem. 1995; 67(3): 473-506.*
Wei, et al., Synthesis of N-Doped Graphene by Chemical Vapor Deposition and Its Electrical Properties, Nano Letters 2009; 9(5): 1752-1758.*

(Continued)

*Primary Examiner* — Daniel C McCracken
(74) *Attorney, Agent, or Firm* — Winstead PC

(57) ABSTRACT

In various embodiments, the present disclosure provides methods of forming graphene films by: (1) depositing a non-gaseous carbon source onto a catalyst surface; (2) exposing the non-gaseous carbon source to at least one gas with a flow rate; and (3) initiating the conversion of the non-gaseous carbon source to the graphene film, where the thickness of the graphene film is controllable by the gas flow rate. Additional embodiments of the present disclosure pertain to graphene films made in accordance with the methods of the present disclosure.

30 Claims, 19 Drawing Sheets

(56) References Cited

U.S. PATENT DOCUMENTS

| | | |
|---|---|---|
| 2007/0259586 A1 | 11/2007 | Sakamoto |
| 2007/0284557 A1 | 12/2007 | Gruner |
| 2008/0023066 A1 | 1/2008 | Hecht |
| 2009/0000661 A1 | 1/2009 | Yoshimoto |
| 2009/0068471 A1 | 3/2009 | Choi |
| 2009/0071533 A1 | 3/2009 | Choi |
| 2009/0110627 A1 | 4/2009 | Choi |
| 2009/0120493 A1 | 5/2009 | Sinha |
| 2009/0130433 A1 | 5/2009 | Takada |
| 2009/0130607 A1 | 5/2009 | Slafer |
| 2009/0146111 A1 | 6/2009 | Shin |
| 2009/0155561 A1 | 6/2009 | Choi |
| 2009/0235721 A1 | 9/2009 | Robinson |
| 2009/0291270 A1 | 11/2009 | Zettl |
| 2010/0021708 A1* | 1/2010 | Kong et al. ............ 428/220 |
| 2010/0044230 A1 | 2/2010 | Papadimitrakopolous |
| 2010/0101710 A1 | 4/2010 | Choi |

OTHER PUBLICATIONS

International Searching Authority, International Search Report and Written Opinion for application No. PCT/US2011/027556, May 5, 2011.

International Searching Authority, International Search Report and Written Opinion for application No. PCT/US2011/027575, May 5, 2011.

International Bureau, International Preliminary Report on Patentability for application No. PCT/US2011/027556, Sep. 20, 2012.

International Bureau, International Preliminary Report on Patentability for application No. PCT/US2011/027575, Sep. 20, 2012.

Higginbotham, Amanda L., et al., "Lower-Defect Graphene Oxide Nanoribbons from Multiwalled Carbon Nanotubes," ACSNANO, vol. 4, No. 4, 2010, 2059-2069.

Zhu, Yu, et al., "High Throughput Preparation of Large Area Transparent Electrodes Using Non-Functionalized Graphene Nanoribbons," Chem. Mater. 2011, 23, 935-939. DOI:10.1021/cm1019553.

* cited by examiner

A

B

GROWTH OF GRAPHENE FILMS FROM NON-GASEOUS CARBON SOURCES

CROSS REFERENCE TO RELATED APPLICATIONS

This application is a continuation-in-part application of PCT Application No. PCT/US2011/027575, filed on Mar. 8, 2011, which claims priority to U.S. Provisional Patent Application Nos. 61/311,615, filed on Mar. 8, 2010; 61/347,700, filed on May 24, 2010; and 61/433,702, filed on Jan. 18, 2011. This application also claims priority to U.S. Provisional Patent Application No. 61/513,300, filed on Jul. 29, 2011. This application is also related to PCT Application No. PCT/US2011/027556, entitled "Transparent Electrodes Based on Graphene and Grid Hybrid Structures", filed on Mar. 8, 2011. The entirety of each of the above-referenced applications is incorporated herein by reference.

STATEMENT REGARDING FEDERALLY SPONSORED RESEARCH

This invention was made with government support under Sandia National Laboratory Grant No. 1100745, awarded by the U.S. Department of Energy; Office of Naval Research Grant No. N00014-09-1-1066, awarded by the U.S. Department of Defense; and Air Force Office of Scientific Research Grant No. FA 9550-09-1-0581, awarded by the U.S. Department of Defense. The government has certain rights in the invention.

BACKGROUND

Graphene films find many applications in various fields, including optoelectronics. Current methods to form graphene films suffer from various limitations, including the inability to use a variety of carbon sources to yield graphene films with desirable thicknesses, sizes, patterns and electrical properties. Therefore, there is currently a need to develop more optimal methods of forming graphene films.

BRIEF SUMMARY

In some embodiments, the present disclosure provides methods of forming graphene films by: (1) depositing a non-gaseous carbon source (e.g., a poly(methyl methacrylate)) onto a catalyst surface (e.g., a copper surface); and (2) initiating the conversion of the non-gaseous carbon source to the graphene film. In some embodiments, the methods of the present disclosure may also include a step of exposing the non-gaseous carbon source to at least one gas with a gas flow rate. In some embodiments, the gas may include at least one of hydrogen, nitrogen, argon, or combinations thereof. In some embodiments, the thickness of the graphene film may be controllable by the gas flow rate. In some embodiments, the methods of the present disclosure may also include a step of adjusting the thickness of the graphene film by adjusting the gas flow rate.

In some embodiments, graphene film formation is initiated under vacuum. In some embodiments, graphene film formation is initiated by heating. In some embodiments, the heating occurs at reaction temperature ranges between about 400° C. to about 1200° C. In some embodiments, the heating may also occur in a reductive environment (e.g., environments with $H_2$/Ar gas streams).

In some embodiments, the non-gaseous carbon source may include at least one of polymers, non-polymeric carbon sources, raw carbon sources, small molecules, organic compounds, fullerenes, fluorenes, carbon nanotubes, phenylene ethynylenes, sucrose, sugars, polysaccharides, carbohydrates, proteins, and combinations thereof. In some embodiments, the non-gaseous carbon source is doped with a doping reagent (e.g., melamine, carborane or aminoborane) before, during or after the initiating step to result in the formation of doped graphene films.

Additional embodiments of the present disclosure pertain to graphene films made by the methods of the present disclosure. In some embodiments, the formed graphene films are monolayers. In some embodiments, the formed graphene films are utilized in electric devices, such as transparent electrodes.

As set forth in more detail below, the methods of the present disclosure provide numerous advantages, including the ability to form graphene films with low defects, low sheet resistance, and ambipolar field effects. The methods of the present disclosure also enable the formation of easily transferable graphene films with desirable sizes, thicknesses and patterns from a variety of non-gaseous carbon sources. As also set forth in more detail below, the graphene films formed by the methods of the present disclosure can find numerous applications in various fields, including optoelectronics.

BRIEF DESCRIPTION OF THE DRAWINGS

FIG. 1A shows a schematic of how a monolayered PG can be derived from the solid PMMA films on Cu substrates. FIG. 1B shows a Raman spectrum (514 nm excitation) of a monolayered PG obtained at 1000° C. FIG. 1C shows a room temperature $I_{ds}$-$V_G$ curve on a PG-based back-gate field effect transistor (FET) device. The upper inset shows the $I_{ds}$-$V_{ds}$ characteristics as a function of $V_G$. $V_G$ changes from 0 V (bottom) to −40 V (top). The lower inset in (c) is the scanning electron microscopy (SEM) (JEOL-6500 microscope) image of this device, where the PG is perpendicular to the Pt leads. FIG. 1D shows a selected area electron diffraction (SAED) pattern of PG. FIGS. 1E-G show high resolution transmission electron microscopy (HRTEM) images of PG films. Black arrows in FIG. 1G indicate the Cu atoms.

FIG. 2A illustrates differences in Raman spectra from PG samples with controllable thicknesses derived from different flow rates of $H_2$. FIG. 2B shows the ultraviolet-visible (UV) absorption spectra of monolayered graphene and bilayered graphene. The UV transmittance (T %) of the corresponding PG is measured at 550 nm. FIG. 2C shows the Raman spectra of graphene derived from sucrose, fluorene and PMMA. FIG. 2D shows HRTEM picture of PG grown on a Ni film. The PG was 3-5 layers at the edges.

FIG. 3A shows XPS analysis from the C1s peak of PG (black) and N-doped PG (red). The shoulder can be assigned to the C—N bond. FIG. 3B shows XPS analysis of the N1s peak (black line) and its peak fitting (square points) of N-doped PG. The atomic concentration of N for this sample is about 2% (C is 98%). No N1s peak was observed for PG. FIG. 3C shows Raman spectra for PG and N-doped PG. FIG. 3D shows room temperature, $I_{ds}$-$V_G$ curves with n-type behavior obtained from three different N-doped graphene-based back-gate FET devices.

FIGS. 8A-8B shows the x-ray photoelectron spectroscopy (XPS) spectra of melamine. FIG. 8C shows the chemical structure of melamine ($C_3H_6N_6$).

FIG. 11A shows a diagram of an experimental apparatus suitable for the growth of graphene films from various raw carbon sources (e.g., food, insects or waste) in a tube furnace. On the left, the Cu foil with the carbon source contained in a quartz boat is placed at the hot zone of a tube furnace. The growth is performed at 1050° C. under low pressure with a $H_2$/Ar gas flow. On the right is a cross view that represents the formation of pristine graphene film on the backside of the Cu substrate. FIG. 11B shows the growth of graphene film from a cockroach leg. FIG. 11B(a) shows one roach leg on top of the Cu foil. FIG. 11B(b) shows the roach leg under vacuum. FIG. 11B(c) shows the residue from the roach leg after annealing at 1050° C. for 15 min. The pristine graphene film grew on the bottom side of the Cu film (not shown).

FIG. 12A shows the original front side of the Cu foil, where there was a large quantity of particle residue after the pyrolysis of the cookie. FIG. 12B shows the backside of the Cu foil.

FIG. 15A shows Raman spectral mapping of 2D/G ratio, over 95% of the scanning area has the signature of $I_{2D}/I_G>1.8$. FIG. 15B shows Raman spectral mapping of D/G ratio, indicating that over 95% of the scanning area has the signature of $I_D/I_G<0.1$. This is confirmation of high-quality monolayer graphene film formation.

FIG. 18A shows the selected area electron diffraction (SAED) pattern. FIG. 18B shows the suspended graphene film on a 1 $\mu m$ diameter hole. FIG. 18C shows the edge of monolayer graphene film.

DETAILED DESCRIPTION

Figure 1:
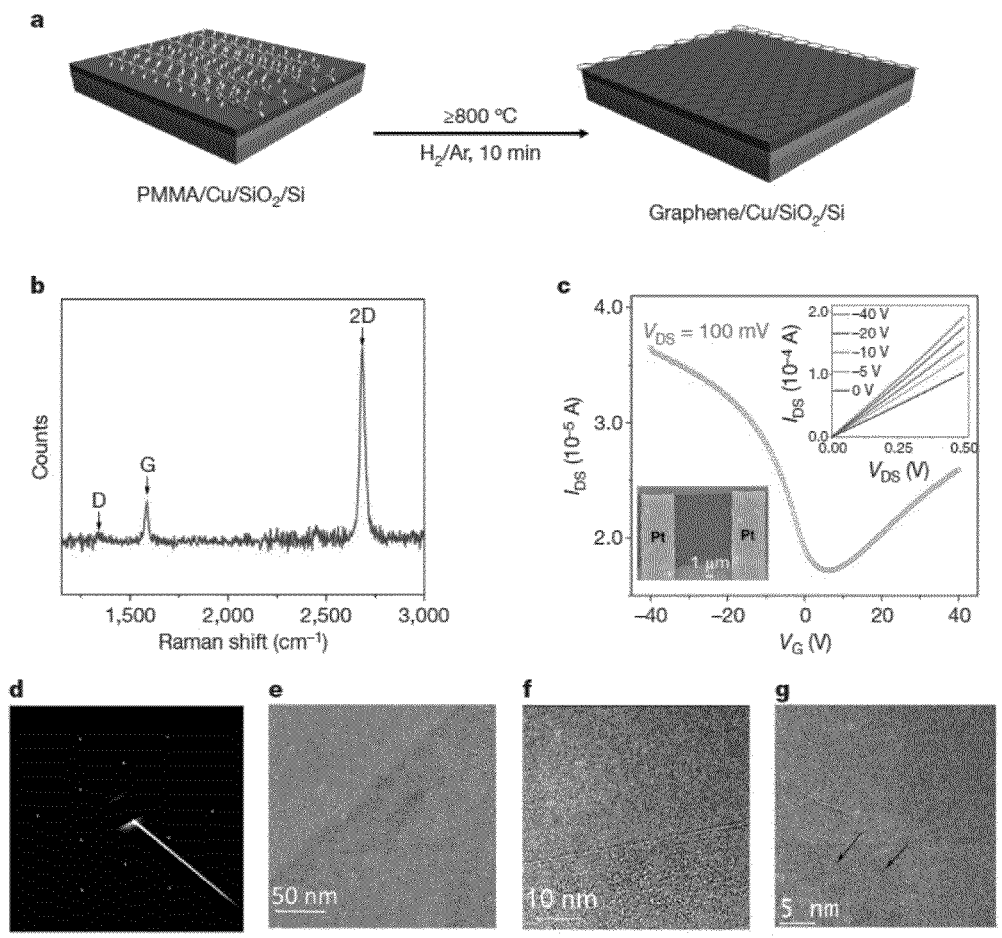
FIG. 1 illustrates synthetic protocols, spectroscopic analyses and electrical properties of a graphene derived from poly (methyl methacrylate) (PMMA-derived graphene or PG).

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Since the discovery of graphene in 2004, many methods were developed to obtain large sheets of monolayered or bilayered graphene. Such methods have included chemical vapor deposition (CVD), mechanical peeling, liquid exfoliation, and reduction of graphene oxide. However, current methods of making graphene films suffer from various limitations that necessitate the development of new techniques.

For instance, with respect to exfoliation methods, researchers originally used adhesive tape to mechanically peel away the graphite crystals into few-layer or monolayer graphene. Later, liquid exfoliation methods were reported. Such methods generally consisted of chemical oxidation and dispersion of graphite, reduction of graphite oxide, and annealing in $Ar/H_2$. However, the quality of the liquid exfoliated graphene was still lower than mechanically exfoliated graphene due to the destruction of the basal plane structure during the oxidation, and incomplete removal of the functional groups.

Recently, many research groups have published several CVD methods for growing large-sized graphene on wafers. However, CVD methods can be expensive. For instance, the growth of epitaxial graphene on single-crystal silicon carbide (SiC) can be costly due to the high price of the 4H—SiC substrates. Moreover, CVD is limited to the use of gaseous raw materials. Such limitations make it difficult to apply CVD to a wider variety of non-gaseous carbon sources that are more readily available at lower costs. Furthermore, many CVD-based methods utilize volatile gaseous precursors that present safety issues.

In addition, many graphene-based electronic devices require that graphene films be grown in large size with controllable thickness and electrical properties. However, the methods of the prior art fail to address these requirements.

Accordingly, Applicants have developed novel methods of forming graphene films that address the aforementioned needs and limitations. Such methods generally involve: (1) depositing a non-gaseous carbon source onto a catalyst surface; and (2) initiating the conversion of the non-gaseous carbon source to a graphene film. In some embodiments, the methods of the present disclosure may also include a step of exposing the non-gaseous carbon source to at least one gas with a gas flow rate. In some embodiments, the thickness of the graphene film may be controllable by the gas flow rate. In some embodiments, the methods of the present disclosure may also include a step of adjusting the thickness of the graphene film by adjusting the gas flow rate.

In some embodiments, the methods of the present disclosure also include steps for separating the formed graphene film from the catalyst surface by coating the graphene film with a protecting layer, separating the catalyst surface from the coated graphene film, and transferring the coated graphene film to a different surface. Various embodiments of the present disclosure allow the non-gaseous carbon source to be doped with a doping reagent before, during or after the initiating step to result in the formation of a doped graphene film. Additional embodiments of the present disclosure pertain to graphene films made by the methods of the present disclosure.

An example of a method of forming graphene films is depicted in FIG. 1A. In this example, poly(methyl methacrylate) (PMMA) is the non-gaseous carbon source, and a copper foil is the catalyst surface. In some embodiments, the copper foil (or other metal catalyst surface being used) is first cleaned with diluted acid (i.e., to remove copper oxide), acetone, and deionized water. The copper foil is then dried with $N_2$ gas purging. In some embodiments, the cleaning method could be either acid cleaning or high temperature annealing under reductive atmospheres.

Next, PMMA (with or without a doping reagent) is spin-coated or drop-casted on one side of the copper foil (though it could be used to coat both sides of a foil or other catalysts structure for conformal growth). The PMMA layer is then vacuum dried to remove the solvent. Thereafter, the copper foil is placed in an $H_2/Ar$ purged furnace. Next, the conversion of PMMA to graphene is initiated by utilizing a reaction temperature of about 800° C.-1000° C. (e.g., by moving the samples stored in a furnace column into a "hot zone"). This results in the catalytic conversion of the non-gaseous carbon source to a graphene film on the copper foil.

Optionally, the formed graphene film may then be separated from the copper foil by spin-coating the graphene with a thin layer of polymer (e.g., PMMA) as a protecting layer for the next step. This is followed by vacuum-drying to remove the solvent. Next, the copper foil is dissolved in a Marble's reagent ($CuSO_4$:HCl:$H_2O$=10 g:50 ml:50 ml). The polymer and graphene film are then lifted off and transferred into deionized water to remove the metal ion and other inorganic contaminations. Next, the obtained film is transferred on different substrates and vacuum dried to remove the water. The polymer is then removed by rinsing with organic solvent or pyrolysis cleaning.

Another example of a method of forming graphene films is depicted in FIG. 11A. In this example, a cockroach leg is the non-gaseous carbon source, and a copper foil is the catalyst surface. The cockroach leg is deposited on a copper foil that is placed on a quartz boat. The assembly is then placed at the hot zone of a tube furnace. The growth is initiated at 1050° C. under low pressure with a $H_2/Ar$ gas flow. As shown on the cross view of FIG. 11A, pristine graphene forms on the backside of the copper foil.

Various aspects of the aforementioned methods of making graphene films will now be discussed in more detail herein. However, Applicants note that the description herein pertains to non-limiting examples of how a person of ordinary skill in the art can make and use the graphene films of the present disclosure.

Non-Gaseous Carbon Sources

In the present disclosure, non-gaseous carbon sources generally refer to any non-gaseous compositions that can be converted to graphene films. As used herein, the term non-gaseous carbon sources refers to carbon sources that are in liquid state, solid state, or combinations thereof, and without a substantial amount of carbon sources that are in gaseous state. However, Applicants note that, in some embodiments, there may be trace or minimal amounts of gaseous carbon sources in the non-gaseous carbon sources of the present disclosure (e.g., without limitation, ~0.001% to 10%). In some embodiments, the non-gaseous carbon sources of the present disclosure may be in a dry state. In some embodiments, the non-gaseous carbon sources of the present disclosure may be vacuum dried.

Various non-gaseous carbon sources may be used to make graphene films. Non-limiting examples of such non-gaseous carbon sources include solid carbon sources, polymers, non-polymeric carbon sources, raw carbon sources, small molecules, organic compounds, fullerenes, fluorenes, carbon nanotubes, phenylene ethynylenes, sucrose, sugars, polysaccharides, carbohydrates, proteins, and combinations thereof. In more specific embodiments, the non-gaseous carbon source comprises one or more carbon-containing small molecules with molecular weights of less than 500 grams/mole.

In more specific embodiments, the non-gaseous carbon source may include a polymer. Suitable polymers that can be used as non-gaseous carbon sources include, without limitation, hydrophilic polymers, hydrophobic polymers, amphiphilic polymers, homopolymers, copolymers, polymer blends, thermoplastic polymers, thermosetting polymers, and combinations thereof. More specific but non-limiting examples of suitable polymers that can be used as non-gaseous carbon sources include PMMA, polystyrenes, polyacrylonitriles, polycarbonates, poly(phenylene ethynylene)s, and cellulose. Other suitable polymers can also be envisioned. In more specific embodiments, the non-gaseous carbon source is PMMA.

In additional embodiments, the non-gaseous carbon source may include a carbon nanotube. Non-limiting examples of carbon nanotubes that can be used as non-gaseous carbon sources include single-walled carbon nanotubes, multi-walled carbon nanotubes, double-walled carbon nanotubes, ultrashort carbon nanotubes, and combinations thereof. In some embodiments, the carbon nanotubes may be functionalized. In some embodiments, the carbon nanotubes may be in pristine or non-functionalized form.

In some embodiments, the non-gaseous carbon sources may include one or more raw carbon sources. In various embodiments, raw carbon sources may generally refer to carbon sources that are unprocessed, unpurified, or mixed with other materials. For instance, in some embodiments, the raw carbon sources may include at least one of food sources, plants, insects, waste products, parts thereof, or combinations thereof. In some embodiments, raw carbon sources may include a food source, such as cookies (e.g., GIRL SCOUT cookies), chocolates, and the like. In some embodiments, the raw carbon sources may include a plant, such as grass, wood, flowers, leaves, mixtures of organic vegetation, and the like. In some embodiments, the raw carbon sources may include an insect, such as an ant or a cockroach. In some embodiments, the raw carbon sources may include waste products, such as feces or pre-used plastics (e.g., bulk polystyrene plastics). Other suitable non-gaseous carbon sources can also be used in accordance with the methods of the present disclosure.

Catalyst Surfaces

In the present disclosure, catalyst surfaces generally refer to surfaces that are capable of converting non-gaseous carbon sources to graphene films. In various embodiments, the catalyst surfaces could be made of porous or non-porous materials. In some embodiments, the catalyst surface is a solid surface. Non-limiting examples of suitable catalyst surfaces can include surfaces that contain one or more of the following atoms: Ni, Co, Fe, Pt, Au, Al, Cr, Cu, Mg, Mn, Mo, Rh, Si, Ta, Ti, W, U, V, Zr, or combinations thereof.

In some embodiments, the catalyst surface is a metal catalyst. In more specific embodiments, the metallic atoms in the catalyst surface may be in reduced and/or oxidized forms. In further embodiments, the metals may be associated with alloys.

The catalyst surfaces of the present disclosure can also have various shapes and structures. For instance, in various embodiments, the catalyst surfaces are circular, square-like, or rectangular. In some embodiments, the catalyst surface can be pre-patterned. In such embodiments, the graphene can be grown following those patterns.

Furthermore, the catalyst surfaces of the present disclosure may have various sizes. In various embodiments, such sizes can be in the nanometer, millimeter, centimeter or meter ranges. For instance, in some embodiments, the catalyst surface can be as small as 1-nanometer on a face, or as a sphere. In some embodiments, the catalyst surface can be as large as 100 square meters on a face, or as a sphere. However, the latter embodiments may require a large furnace. For the latter embodiments, roll-to-roll films of metal could also be used as the catalyst surface as the metal passes though a furnace's hot-zone.

Deposition of Non-Gaseous Carbon Sources onto Catalyst Surfaces

Various methods may also be used to deposit non-gaseous carbon sources onto catalyst surfaces. Such methods can include, without limitation, spin-coating, drop-casting, spray coating, dip coating, physical application, sublimation, blading, inkjet printing, screen printing, direct placement, or thermal evaporation.

The above-mentioned step can also be used to control the thickness of graphene films. For instance, as discussed in more detail below, a non-gaseous carbon source may be deposited onto a catalyst surface until a desired thickness for the graphene film is achieved. In some embodiments, such desired thickness can be anywhere from about 0.6 nm to about 10 μm.

Furthermore, the above-mentioned step can be used to form a carbon layer with a uniform or non-uniform thickness. This in turn can result in the formation of a graphene film with the desired thicknesses.

Doping of Non-Gaseous Carbon Sources

The non-gaseous carbon sources deposited onto the catalyst surface may be doped or un-doped. In some embodiments, the non-gaseous carbon sources are un-doped. This can result in the formation of pristine graphene films. In additional embodiments, the non-gaseous carbon source deposited onto the catalyst surface may doped with a doping reagent. This can result in the formation of doped graphene films.

Various doping reagents may be used in non-gaseous carbon sources. In some embodiments, the doping reagents may be heteroatoms of B, N, O, Al, Au, P, Si, and/or S. In more specific embodiments, the doping reagents may include, without limitation, melamines, boranes, carboranes, aminoboranes, ammonia boranes, phosphines, aluminum hydroxides, silanes, polysilanes, polysiloxanes, phosphites, phosphonates, sulfides, thiols, ammonia, pyridines, phosphazines, borazines, and combinations thereof. In some embodiments, the doping reagents may be $HNO_3$ or $AuCl_3$. In some embodiments, $HNO_3$ or $AuCl_3$ may be applied after the graphene film growth rather than during the growth. In more specific embodiments, the doping reagent is melamine.

In some embodiments, the doping reagent may be added directly to the non-gaseous carbon source. In various embodiments, the doping can occur before, during or after the initiation step of graphene film formation. For instance, in some embodiments, the doping can occur during the conversion of the non-gaseous carbon source to graphene films.

In more specific embodiments, the doping reagent is added to the non-gaseous carbon source as a gas during the conversion of the non-gaseous carbon source to graphene films. In such embodiments, the doping reagent may comprise at least one of ammonia, pyridine, phosphazine, borazine, borane, and ammonia borane.

In some embodiments, the doping may occur after the completion of graphene film formation. In some embodiments, the doping reagent may be covalently bound to the non-gaseous carbon source. For instance, a doping reagent may be covalently linked to a polymer's backbone or exogenous additives.

Furthermore, the doping reagents of the present disclosure can have various forms. For instance, in various embodiments, the doping reagents could be in gaseous, solid and/or liquid phases. In addition, the doping reagent could be one reagent or a combination of different reagents. Moreover, various doping reagent concentrations may be used. For instance, in some embodiments, the final concentration of the doping reagent in the non-gaseous carbon source could be from about 0% to about 25%.

In some embodiments that are discussed in more detail below, as doping reagents are added to the molecular structure or carbon source material, doped graphene films can form through the insertion of doping reagents (e.g., heteroatoms) into the graphene network, or along the graphene network Initiation of Graphene Film Formation Various methods may also be used to initiate the formation of graphene films on catalyst surfaces. In some embodiments, the initiating step may include a heating step, where suitable reaction temperatures are utilized. In some embodiments, the suitable reaction temperature may be between about 400° C. to about 1200° C. In more specific embodiments, the suitable reaction temperature is about 800° C.

In some embodiments, suitable reaction temperatures are attained by elevating the environmental temperature. For instance, a sample containing a carbon source on a catalyst surface may be placed in a furnace. The furnace temperature may then be elevated to a suitable temperature, such as about 800° C.

In some embodiments, suitable reaction temperatures may be attained by moving a sample to a suitable environment. For instance, a sample containing a carbon source on a catalyst surface may be in a furnace column. Thereafter, the sample may be moved into a "hot zone" of the furnace that has a suitable temperature (e.g., about 800° C.). See, e.g., FIG. 11A.

Various environmental conditions may also be used to initiate graphene film formation. For instance, in some embodiments, graphene film formation may occur in a closed environment, such as an oven or a furnace. In some embodiments, the initiating step may occur under vacuum. In some embodiments, the vacuum may have a pressure of about $10^{-6}$ Torr.

In some embodiments, the initiating step may occur under a stream of one or more gases. For instance, in some embodiments, the non-gaseous carbon sources may be exposed to one or more gases prior to or during the initiating step. In some embodiments, the one or more gases may have one or more individual gas flow rates. In some embodiments, the thickness of the graphene film may be controllable by the one or more individual gas flow rates. Accordingly, various embodiments of the present disclosure also include a step of adjusting the thickness of the graphene film by adjusting the one or more individual gas flow rates.

In some embodiments, the one or more individual gas flow rates may range from about 1 sccm (standard cubic centimeters per minute) to about 2,000 sccm. In some embodiments, the one or more individual gas flow rates may range from about 10 sccm to about 500 sccm.

In some embodiments, the one or more individual gas flow rates may range from about 10 cm$^3$ STP min$^{-1}$ to about 1,000 cm$^3$ STP min$^{-1}$. In some embodiments, the one or more individual gas flow rates may range from about 100 cm$^3$ STP min$^{-1}$ to about 500 cm$^3$ STP min$^{-1}$.

In some embodiments, the one or more gases may include, without limitation, hydrogen, nitrogen, argon, or combinations thereof. In some embodiments where more than one gas is used, the different gases may have different individual gas flow rates. For instance, in some embodiments, the flow rate of one gas (e.g., hydrogen) may range from about 1 sccm to about 50 sccm, while the flow rate of another gas (e.g., argon) may range from about 100 sccm to about 500 sccm.

In some embodiments, graphene film formation may occur in a reductive environment. A specific example of a reductive environment is an environment that contains a stream of a reductive gas, such as a stream of $H_2$ or Ar gases. In more specific embodiments, graphene film formation may occur in a furnace that contains a stream of $H_2$/Ar gas.

Various time periods may also be used to initiate and propagate graphene film formation. For instance, in some embodiments, the heating can occur in a time period ranging from about 1 minute to about 10 hours. In more specific embodiments, the heating may occur in a time period ranging from about 1 minute to about 60 minutes. In more specific embodiments, the heating may occur for about 10 minutes.

Various methods may also be used to heat graphene films. For instance, in some embodiments, the heating may be performed by induction heating. In some embodiments, the energy source for the heating could be derived from radiating energy (e.g., laser), infrared rays, microwave or X-rays.

Graphene film formation can also occur under various pressures. In some embodiments, such pressure ranges can be from about 0.01 mm Hg to about 10 atmospheres of pressure. In more specific and preferred embodiments, pressure ranges can be from about 1 mm Hg to about 1 atmosphere.

Separation of Graphene Films from Catalyst Surfaces

Various embodiments of the present disclosure also include methods of separating the formed graphene films from the catalyst surfaces. In some embodiments, such methods may include: (1) coating the graphene film with a protecting layer; (2) separating the catalyst surface from the coated graphene film; and (3) transferring the graphene film to a different surface.

In some embodiments, the protecting layer may be a polymer, such as PMMA or polycarbonate (PC). In some embodiments, the catalyst surface is separated from the graphene film by dissolving the catalyst surface in a solvent. In some embodiments, the solvent may include a Marble's reagent (as previously described). In more specific embodiments, the graphene film may be separated from the catalyst surface by acid-etching.

As set forth in more detail below, the isolated graphene films may then be applied to various surfaces and used in numerous applications. As also set forth in more detail below, the formed graphene films can have numerous advantageous properties.

Control of Graphene Film Thickness

A specific advantage of the methods of the present disclosure is the ability to control graphene film thickness. Thickness of graphene films can be controlled by adjusting one or more conditions during graphene film formation. Such adjustable conditions include, without limitation: (1) non-gaseous carbon source type; (2) non-gaseous carbon source concentration; (3) gas flow rate (e.g., $H_2$/Ar flow rate); (4) pressure; (5) temperature; and (6) catalyst surface type.

In some embodiments, the thickness of the graphene film may be adjusted by adjusting a flow rate of one or more gases. For instance, in some embodiments, a decrease in a gas flow rate may lead to the formation of thicker graphene films. In some embodiments, an increase in a gas flow rate may lead to the formation of thinner graphene films.

Figure 9:
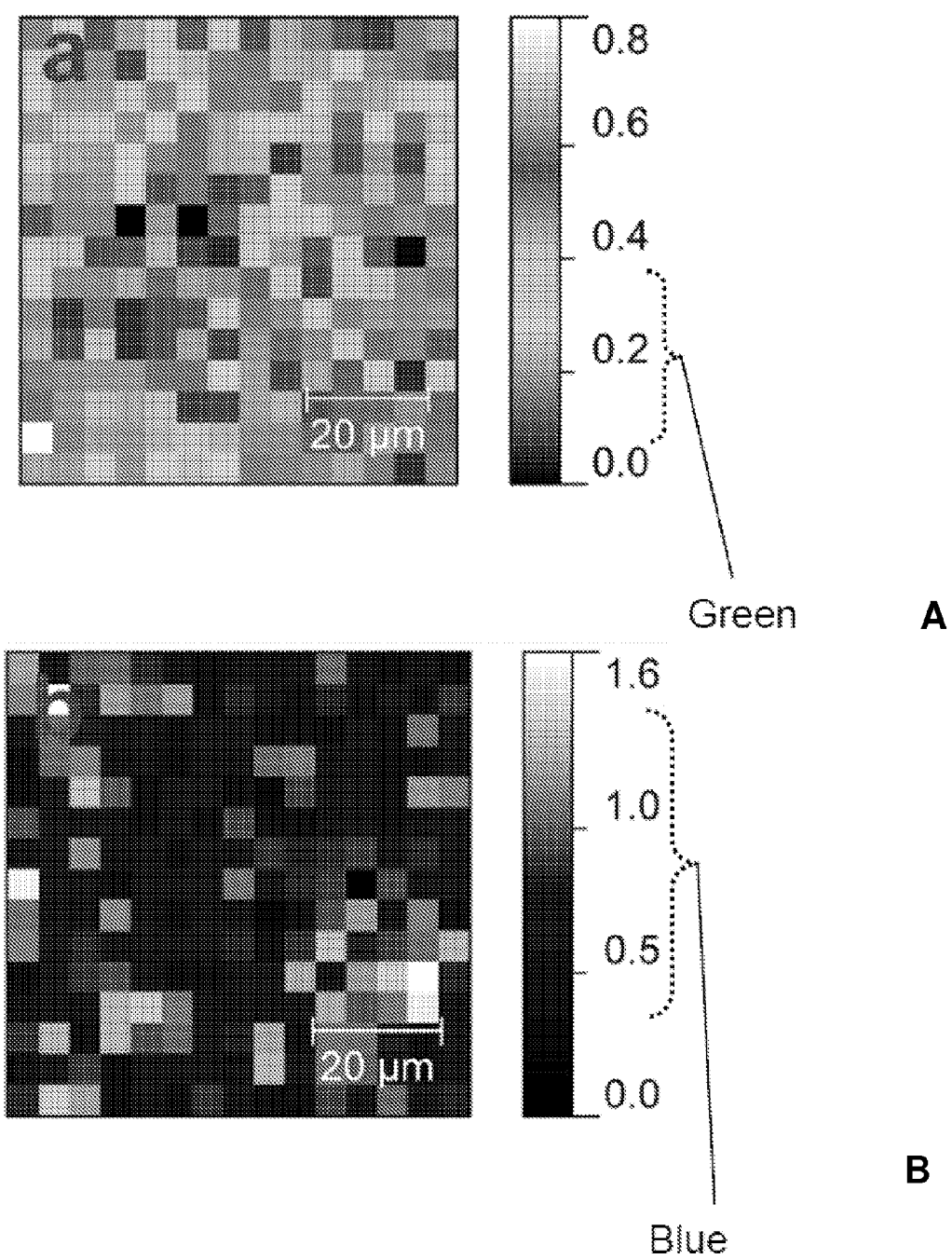
FIG. 9 shows two-dimensional Raman spectral mapping of monolayered (FIG. 9A) and bilayered (FIG. 9B) PG graphene films (75×75 $\mu m^2$) at 514 nm. The color gradient bar to the right of each map represents the G/2D peak ratio. The green and black areas in FIG. 9A are monolayer graphene with an IG/I2D<0.4, suggesting at least 95% monolayer coverage. The blue area in FIG. 9B represents bilayered graphene with an IG/I2D ~0.8, suggesting more than 85% bilayer coverage. The lateral scale bars are 20 $\mu m$.

In some embodiments, the thickness of the graphene film can range from about 0.6 nm to about 10 μm. In some embodiments, the formed graphene film is a monolayer with a thickness of about 0.7 nm. See, e.g., FIGS. 9A and 10. In some embodiments, the formed graphene film is a bilayer. See, e.g., FIG. 9B. In some embodiments, the graphene films can have from about 2 layers to about 9 layers. In some embodiments, the graphene films may have up to 100 layers.

Modes of Graphene Film Growth

The methods of the present disclosure may also be used to grow graphene films on various surfaces of a catalyst. For instance, in some embodiments, a non-gaseous carbon source may be deposited on a first surface of the catalyst. Subsequently, the graphene film may form on a second surface of the catalyst. In some embodiments, the first surface and the second surface are on opposite sides of the catalyst. See, e.g., FIG. 11A.

In some embodiments, a non-gaseous carbon source may be deposited on a first surface of the catalyst. Subsequently, the graphene film may form on the first surface and a second surface of the catalyst. In some embodiments, the first surface and the second surface are on opposite sides of the catalyst.

Additional Advantages

The graphene films and methods of the present disclosure can provide numerous additional advantages. Such advantages can include, without limitation: (1) low defects and low sheet resistance; (2) ambipolar field effects; (3) low temperature growth; (4) patterned growth; (5) growth from different non-gaseous carbon sources; (6) large area growth; (7) easy transferability; and (8) low costs.

Low Defects and Low Sheet Resistance

In general, the graphene films produced by the methods of the present disclosure can have low defects and low resistance. For instance, as indicated in more detail in the Examples below, Raman spectrum shows that PG's are highly crystalline. See FIG. 2B. In addition, the corresponding monolayer PG's sheet resistance is about 1200 $\Omega$/sq. In some embodiments, the methods of the present disclosure may be used to form graphene films with sheet resistance that range from about 300 $\Omega$/sq to about 5,000 $\Omega$/sq.

Ambipolar Field Effects

The graphene films produced by the methods of the present disclosure can also show ambipolar behavior. See, e.g., FIG. 1C.

Low Temperature Growth

Figure 6:
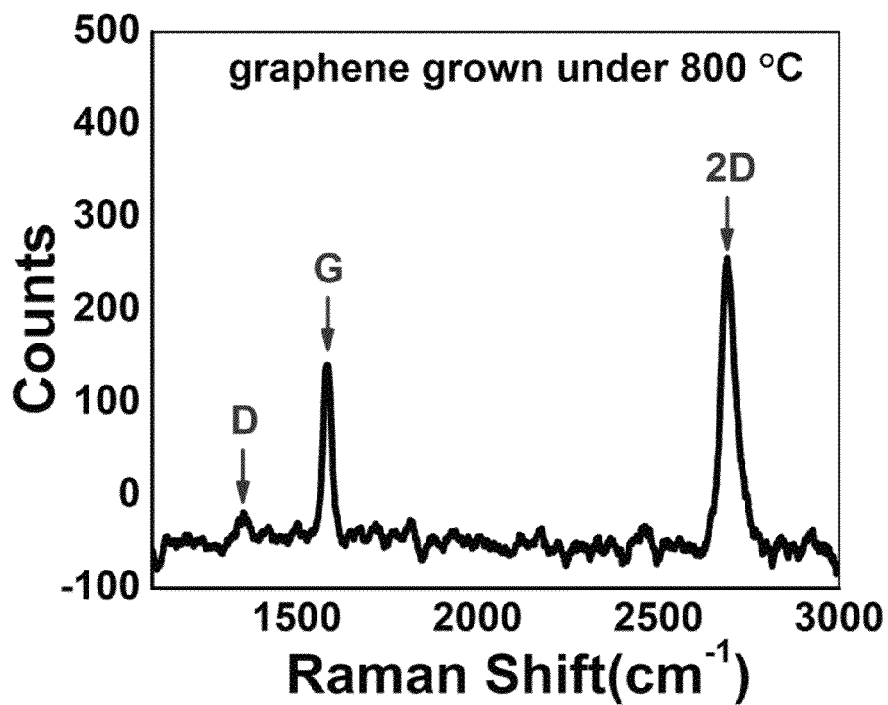
FIG. 6 shows Raman spectrum of PG grown at 800° C.

The methods of the present disclosure can also be used to grow graphene films at relatively low temperatures. For instance, as discussed in more detail in the Examples below, Applicants have been able to obtain high quality graphene films at reaction temperatures of about 800° C. See, e.g., FIGS. 1A-1B and FIG. 6. Such temperatures are lower than the original report of CVD growth temperatures on copper foils. In some embodiments, this lower temperature growth could be critical for various applications, such as compatibility with embedded doped silicon electronics applications. In some embodiments, graphene films can also be formed at about 750° C., even though they may have larger D bands. In some embodiments, the methods of the present disclosure may be used to grow graphene films at temperatures that range from about 500° C. to about 1070° C.

Patterned and Tunable Growth

Figure 3:
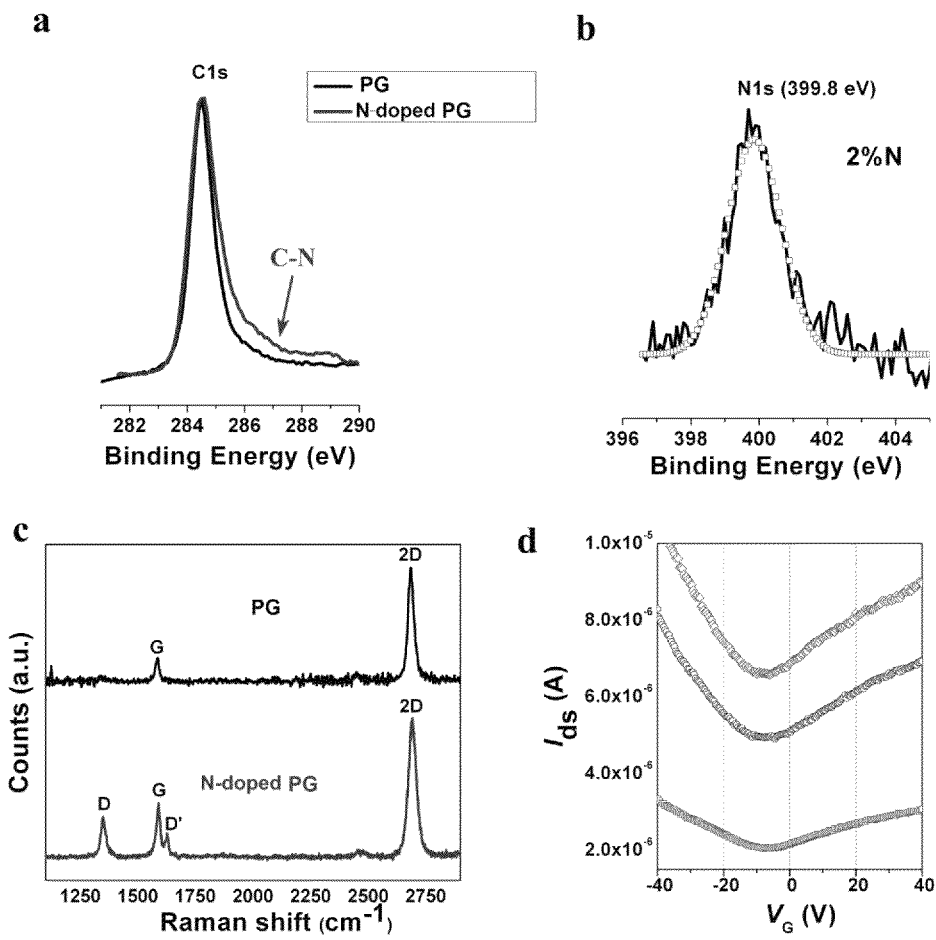
FIG. 3 shows spectroscopic analysis and electrical properties of PG and N-doped PG.

Applicants have also observed that graphene films have effective growth rates when doped or un-doped non-gaseous carbon sources are used in accordance with the methods of the present disclosure. See, e.g., FIG. 3. Furthermore, the dopant concentration in the final graphene films can be tuned by the concentration of the doping reagent in the starting polymer solutions. Therefore, Applicants envision that the methods of the present disclosure have the potential to be used for tunable growth of graphene films. Likewise, the graphene films can be grown on various patterned surfaces to attain patterned growth.

Growth from Different Non-Gaseous Carbon Sources

Figure 2:
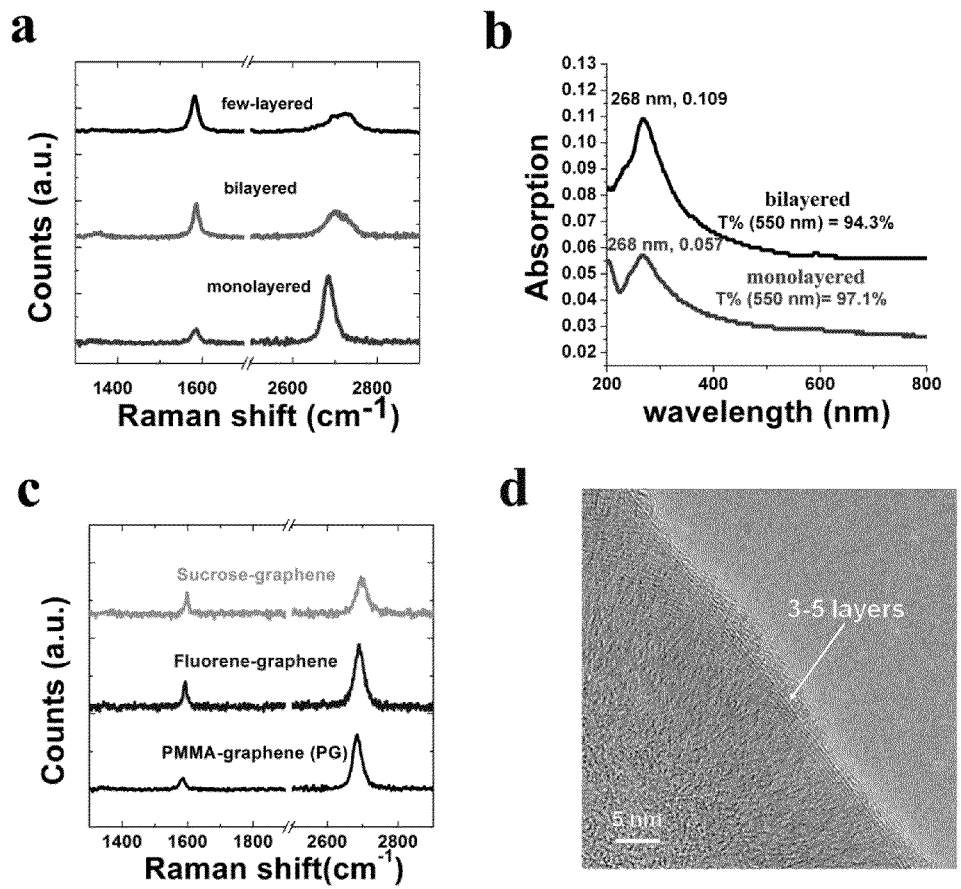
FIG. 2 shows data relating to the controllable growth of pristine graphene films.

Another advantage of the present disclosure is that numerous non-gaseous carbon sources can be used to produce graphene films. For instance, as illustrated in FIG. 2C and discussed in more detail in the Examples below, high quality monolayered PG can be grown from different solid non-gaseous carbon sources, including precursors containing potential topological defect generators (e.g., the five-member ring in fluorene) or high concentrations of heteroatoms (i.e., oxygen in sucrose). Likewise, as illustrated in FIGS. 11-19 and discussed in more detail in the Examples below, high quality graphenes can be grown from raw non-gaseous carbon sources that are readily available at minimal costs.

Large Area Growth

As discussed previously, various sizes of catalyst surfaces can be used in various embodiments of the present disclosure. Therefore, large graphene films may be generated by the methods of the present disclosure. For instance, graphene films with areas in the centimeter range or square meter range (as discussed) can be obtained by using the methods of the present disclosure.

Easy Transferability

In some embodiments, the present disclosure also provides effective methods of transferring the formed graphene films onto different substrates in a non-destructive manner. This provides an effective way of maintaining the integrity and efficacy of the graphene films for many applications, including use in transparent electrodes.

Low Costs

The methods of the present disclosure can be used to grow graphene films from numerous non-gaseous carbon sources that are readily available at little or no cost. For instance, many raw non-gaseous carbon sources are readily available in nature. Therefore, the methods of the present disclosure also provide a cost-effective method of forming high quality graphene films.

Applications

The graphene films formed by the methods of the present disclosure can have numerous applications. For instance, in some embodiments, the graphene films formed by the methods of the present disclosure can be used as electrodes for optoelectronics applications, such as organic photovoltaics, organic light emitting devices, liquid crystal display devices, touch screens, "heads-up" displays, goggles, glasses and visors, and smart window panes. In some embodiments, the graphene films of the present disclosure may also find applications in flexible solar cells and organic light emitting diodes (OLEDs).

Furthermore, the graphene films of the present disclosure can find applications in various transparent electrode hybrid structures. Such structures have been disclosed in Applicants' co-pending PCT Application No. PCT/US2011/027556, entitled "Transparent Electrodes Based on Graphene and Grid Hybrid Structures", filed on Mar. 8, 2011. The entirety of this application is incorporated herein by reference.

ADDITIONAL EMBODIMENTS

Reference will now be made to more specific embodiments of the present disclosure and experimental results that provide support for such embodiments. However, Applicants note that the disclosure below is for exemplary purposes only and is not intended to limit the scope of the claimed invention in any way.

Example 1

Growth of Graphene from Various Non-Gaseous Carbon Sources

In this Example, Applicants demonstrate that large area, high-quality graphene films with controllable thickness can be grown from different solid non-gaseous carbon sources, such as polymer films or small molecules, at temperatures as low as 800° C. Both pristine graphene and doped graphene were grown with this one-step process using the same experimental set-up. Temperatures of 800° C. are attractive because underlying silicon chips can contain dopants. The dopants will minimally migrate at 800° C. However, at more typical temperatures of 1000° C., dopant migration can make the use of silicon devices exceedingly difficult.

With its extraordinary electronic and mechanical properties, graphene is showing promise in a plethora of applications. Graphene can now be obtained by several different approaches. The original mechanical peeling method from highly oriented pyrolytic graphite (HOPG) yields small amounts of high quality graphene. Liquid exfoliation and reduction of graphene oxide have been used to produce chemically converted graphene in large quantities. Annealing SiC and CVD are efficient methods to synthesize large-size graphene on wafers. By introducing Ni and Cu as the substrates for CVD growth, the size, thickness and quality of the produced graphene is approaching industrially useful specifications. However, intrinsic graphene is a zero band gap material which shows a weak ambipolar behavior. These graphene based transistors show small ON/OFF ratios, so they are too metallic for many designed electronics applications. In order to manipulate the Fermi level of graphene, having bilayer configurations may be needed. Alternatively, doping the graphene matrix with heteroatoms is a straightforward way to make an n-type, p-type or hybrid doped graphene.

In the present Example, the growth of monolayered pristine graphene from solid non-gaseous carbon sources atop metal catalysts is demonstrated. See FIG. 1A. The first solid non-gaseous carbon source used was a spin-coated poly(methyl methacrylate) (PMMA) thin film. The metal catalyst substrate was Cu film. At a range as low as 800° C. or as high as 1000° C. (tested limit) for 10 min, with a reductive gas flow ($H_2$/Ar) under low pressure conditions, a single uniform layer of graphene was formed on the substrate. The graphene material thus produced was successfully transferred to different substrates for further characterization (as discussed in more detail below).

The Raman spectrum of this monolayered PMMA-derived graphene (PG) is shown in FIG. 1B. The spectrum is characteristic of more than 10 locations recorded over 1 $cm^2$ of the sample. The two most pronounced peaks in this spectrum are the G peak at 1580 $cm^{-1}$ and the 2D peak at 2690 $cm^{-1}$. The $I_{2D}/I_G$ intensity ratio is about 4, and the full width at half maximum (FWHM) of the 2D peak is about 30 $cm^{-1}$. These results indicate that the graphene is a monolayer. The D peak (~1350 $cm^{-1}$) is in the noise level for PG, indicating the presence of few $sp^3$ carbon atoms or defects.

The electrical properties of the PG were evaluated with a back-gated field-effect transistor (FET) device atop a 200 nm thick $SiO_2$ dielectric. Typical data for the FET devices is shown in FIG. 1C. For this particular device, the estimated carrier (hole) mobility is ~410 $cm^2 V^{-1} s^{-1}$ at room temperature, and the ON/OFF ratio is ~2, which is expected in graphene-based FET devices of this size. Although the graphene was pristine without any doping atoms, it still shows a weak p-type behavior with the neutrality point moved to positive gate voltage, probably arising from the physisorption of small molecules like $H_2O$. Placing these graphene FETs under high vacuum ($10^{-5}$ Torr) for several days moves the neutrality point to zero. See FIG. 4. This observation confirms that the weak p-type behavior was due to physisorption of volatile molecules.

Transmission electron microscopy (TEM) images of the pristine PG and its diffraction pattern are shown in FIGS. 1D-G. The selected area electron diffraction (SAED) pattern in FIG. 1D displays the typical hexagonal crystalline structure of graphene. The layer count on the edges of the images indicates the thickness of the PG. The PG edges in FIGS. 1E-G were randomly imaged under TEM, and most were monolayered or bilayered PG, which corroborates with the Raman data. Although most of the PG surface was continuous and crystalline according to its diffraction pattern, there is adsorbed PMMA resulting from the transfer step. Metal atoms or ions were also found to be trapped on the PG surface (see black arrows in FIG. 1G) as charge impurities that should increase the charge density but decrease the PG mobility. Similar phenomena have been observed with CVD-generated graphene.

Figure 10:
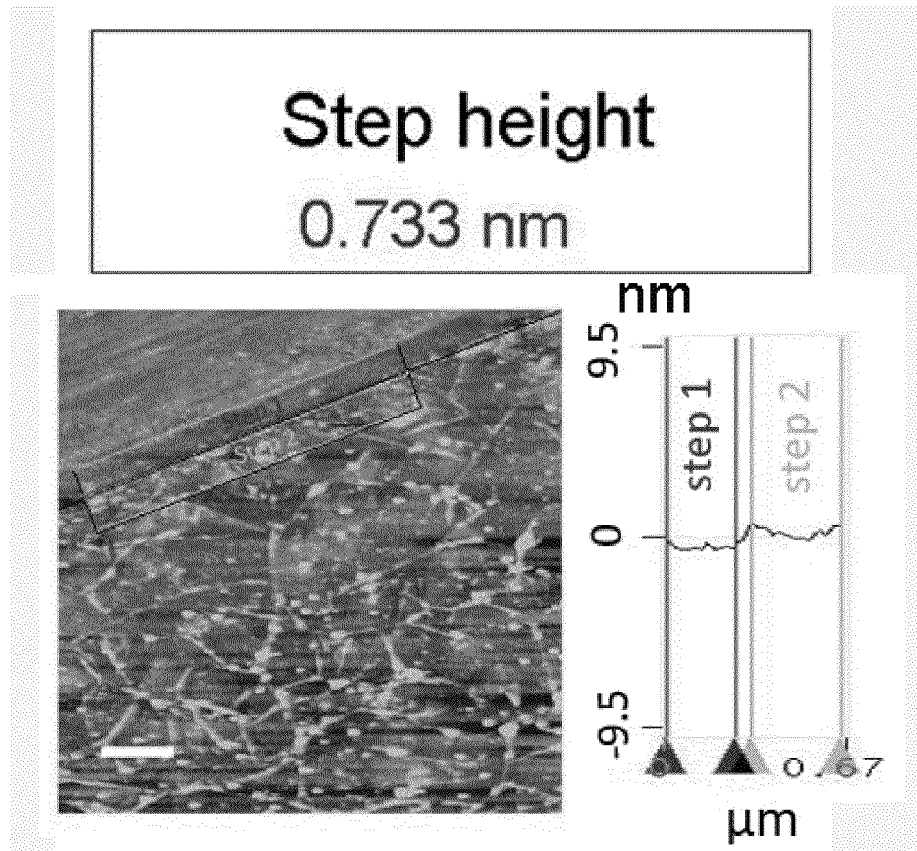
FIG. 10 shows an atomic force microscopy (AFM) image (left panel) and height profile (right panel) of a monolayer PG on a $SiO_2$/Si substrate. Specifically, Step 1 (red) represents the height profile of the $SiO_2$/Si substrate. Step 2 (green) is the height profile of the graphene film edge. The step height is about ~0.7 nm, which reflects the thickness of the PG. The AFM scale bar is 1 $\mu m$.

AFM was used to characterize the surface profile of PG on a $SiO_2$/Si substrate. In FIG. 10, the thickness of the PG is about 0.7 nm, which confirms the monolayer nature of this material. However, limited by the wet-transfer technique, graphene's intrinsic corrugation is still apparent in the AFM image.

Graphene's electronic properties are strongly associated with its thickness. Therefore, it would be useful to be able to control the thickness when producing the graphene by tuning the growth parameters. Applicants have found that PG's thickness can be controlled from monolayer, to bilayer to a few layers by changing the Ar and $H_2$ gas flow rate. Typical thicknesses were evaluated by Raman spectroscopy and UV transmittance of the graphene. See FIGS. 2A-2B. At 1000° C., a bilayered or few-layered PG was obtained when the Ar flow rate was 500 sccm and the $H_2$ flow rate was 10 sccm or less. When the $H_2$ flow rate increased to 50 sccm or higher, only monolayered graphene was formed on the Cu substrate. Also see FIG. 9A.

Monolayered graphene showed a transmittance of about 97.1%. See FIG. 2B. It had a sheet resistance ($R_s$) of 1200 $\Omega$/sq by the 4-probe method, which makes it a transparent electrode material of interest. The bilayer graphene's transmittance is about 94.3%, which shows linear enhancement in the UV absorption. The few-layered PG sheet in FIG. 2A has a transmittance of 83% at 550 nm, which can be estimated as a 6-layered PG.

Figure 5:
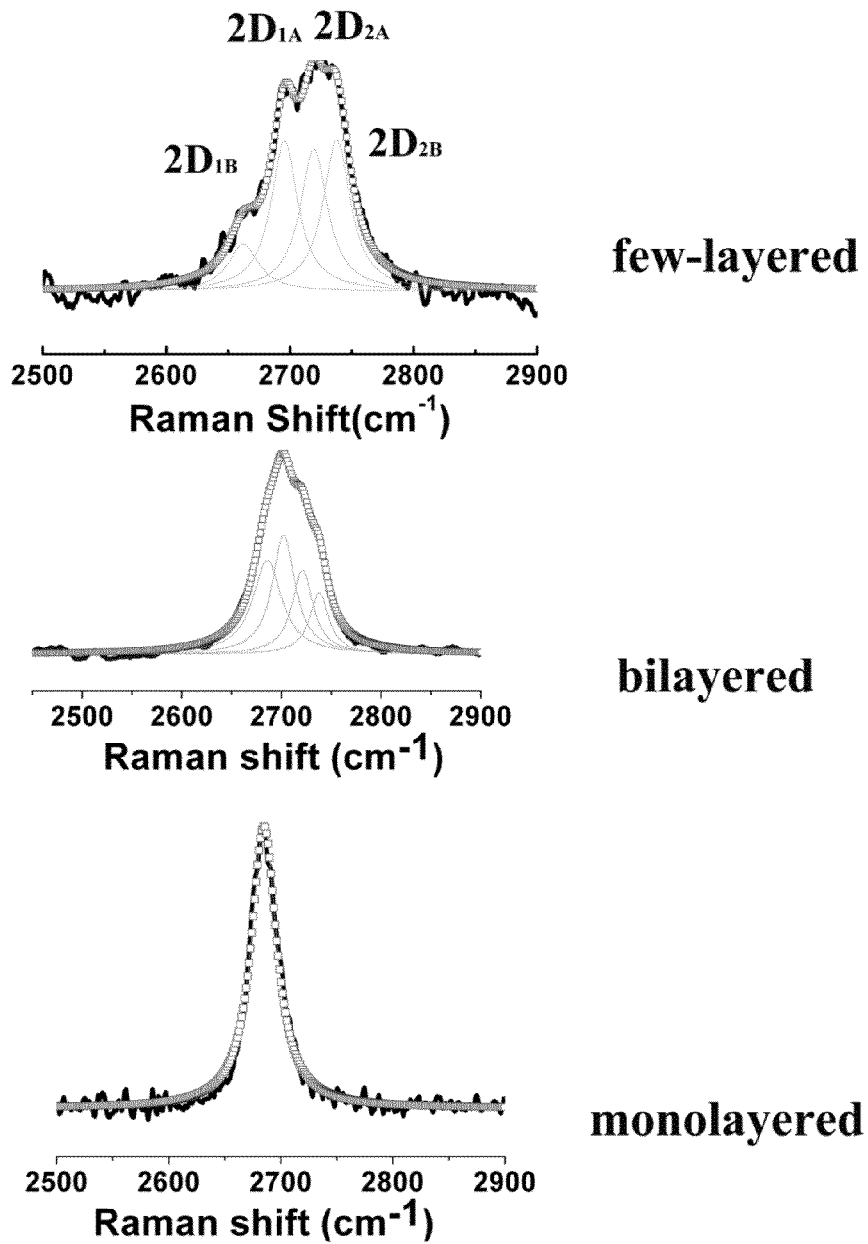
FIG. 5 shows Raman 2D peak fittings of different layered PGs. Monolayered PG's 2D band is fitted with a single Lorentz peak. Bilayered and few-layered graphene 2D bands are splitting into 4 components: $2D_{1B}$, $2D_{1A}$, $2D_{2A}$, $2D_{2B}$ (green peaks, from left to right). Solid lines are from the original data. Square points are the fitting curves.

Both the shape and the positions of the 2D peak are significantly different from monolayered graphene to bilayered graphene and few-layered graphene. See FIG. 5. For monolayered graphene, the 2D peak can be fitted with single sharp Lorentz peak. The observed 2D splitting in bilayered and few-layered graphene can be assigned to the electronic band splitting caused by the interaction of the PG planes. $H_2$ acts as both the reducing reagent and the carrier gas to remove C atoms that are extruded from the decomposing PMMA during growth. Some metal catalysts, such as Ni, are known to reverse graphene growth by converting graphene to hydrocarbon products, therefore cutting graphene along specific directions. This reverse reaction does not appear to occur on the PG which is atop the Cu.

High quality monolayered PG was obtained at 800° C. by this method, lower than the original report for CVD growth temperature on Cu. See FIG. 6. For the semiconductor industry, the lower processing temperature is favorable because temperatures as high as 1000° C. would be problematic in the fabrication of the multi-layered stacks of heterogeneous materials. Therefore, in addition to changing the Ar/$H_2$ flow rate, the graphene growth process was conducted using different temperatures. The quality of the graphene films was monitored by the D/G peak ratio from Raman spectroscopic analysis. The D/G ratio for graphene sheets obtained at 800° C. is less than 0.1. At 750° C., the D/G peak ratio was ~0.35. Hence, 800° C. may be the lower limit for high quality graphene from PMMA in some embodiments. See FIG. 6.

Applicants also used other solid non-gaseous carbon sources including fluorene ($C_{13}H_{10}$) and sucrose (table sugar, $C_{12}H_{22}O_{11}$) to grow monolayered graphene on Cu catalyst under the same growth conditions as was used for the PG. Because these precursors are powders not films, 10 mg of each as a finely grinded powder was placed directly on a 1 cm² Cu foil. After subjecting the powder-coated Cu films to the same reaction conditions as used for PG, Raman spectra indicated that all of the solid non-gaseous carbon sources have been transformed into monolayered graphene with no D peak observed. See FIG. 2C. Although these solid carbon precursors contain potential topological defect generators (the five-member ring in fluorene) or high concentration of heteroatoms (oxygen in sucrose), they produce high quality pristine graphene. Without being bound by theory, it is possible that at elevated temperatures under vacuum, C has a higher affinity for the metal catalyst surface than the heteroatoms; atom rearrangement occurs and most of the topological defects are self-healed as the graphene is formed.

Figure 7:
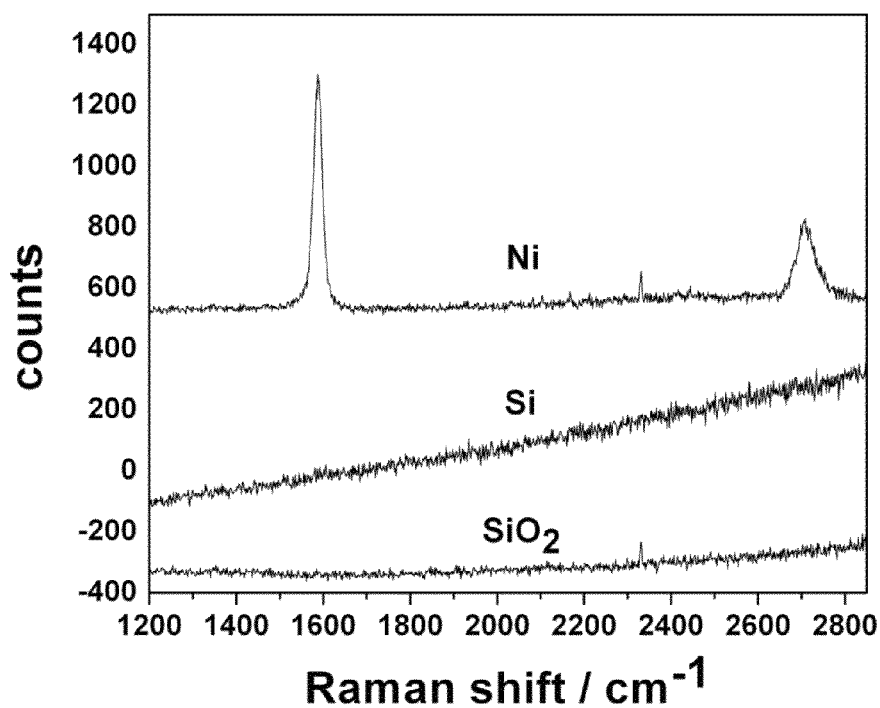
FIG. 7 shows Raman spectra of PMMA films that were heated on Ni, Si<100> with native oxide, or 200-nm-thick thermally grown $SiO_2$.

Other substrates such as Ni, Si<100> with native oxide and thermally grown $SiO_2$ were also tested to determine if they would grow graphene when coated with PMMA. FIG. 2D is the high resolution TEM image of PG grown on a Ni catalyst, which clearly illustrates the few-layered structure around the edges of PG. The Raman spectra in FIG. 7 confirm that Ni is an efficient catalytic substrate to convert PMMA into highly crystalline graphene materials with no D peak around 1350 cm$^{-1}$. Under the same growth conditions, neither graphene nor amorphous carbon was obtained on Si or $SiO_2$ substrates according to the Raman spectroscopic analysis of the surface after the reaction. This demonstrates the potential to grow patterned graphene from a thin film of shaped Ni or Cu deposited directly on Si/$SiO_2$ wafers without post lithography treatment since PG will not grow on the Si or $SiO_2$ surfaces.

Pristine graphene can show weak p-type or n-type behavior due to physisorption of small molecules, such as $H_2O$ or $NH_3$. However, this chemical doping effect induced by physisorption is labile because it can be easily desorbed under heat or vacuum. Therefore, intrinsically nitrogen-doped (N-doped) graphene is more challenging to make compared to pristine graphene. Intrinsically, N-doped graphene has been obtained by two methods: introducing a doping gas ($NH_3$) into the CVD systems during the graphene growth; or treatment of synthesized graphene or graphene oxide with $NH_3$ by annealing or plasma. Here, by using the solid carbon sources and solid doping reagents, doped graphene can be grown in one step without any changes to the CVD system.

Figure 8:
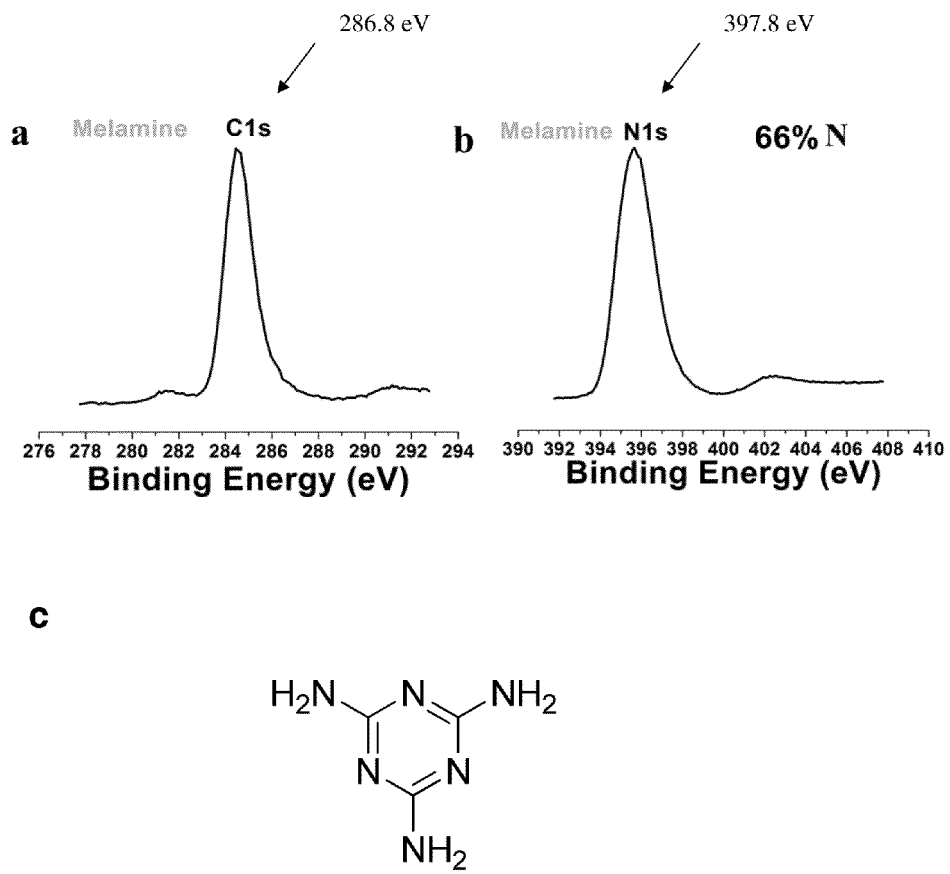
FIG. 8 shows various attributes of melamine, a doping reagent with about 66% of nitrogen in atomic concentration compared to C.

A doping reagent (melamine, $C_3N_6H_6$) was mixed with PMMA and deposited onto the Cu surface. In order to keep the nitrogen-atom concentration in the systems, Applicants used conditions similar to the PG growth except that the growth was done under atmospheric pressure. See Examples below. The prepared polymer films were successfully converted into N-doped graphene, with an N content of 2-3.5%. The XPS data shows the difference of the C1s peaks between PG and N-doped PG. See FIG. 3A. The shoulder around 287 eV can be assigned to the C—N bonding. The N1s peak of N-doped PG indicates that only one type of N is present, at 399.8 eV, corresponding to quaternary N in graphene. See FIG. 3B. This new N1s peak also has a 2 eV shift from that in melamine which shows an N1s peak at 397.8 eV. See FIG. 8. The new N1s peak suggests that the N1s signal does not come from the melamine but that the N atoms are uniformly bound into the graphene structure. The D peak of this material is always present in the Raman spectra because the heteroatoms break the graphene symmetry and thereby introduce defects that are detected by Raman analysis. See FIG. 3C. The D' peak is also found in doped graphene materials obtained by the other doping methods. The 2D peak position and $I_{2D}/I_G$ intensity ratio reveals that this N-doped PG is monolayered. Compared to PG, the $I_{2D}/I_G$ decreased from 4 to 2, implying a successful doping according to the electrostatically gated Raman results.

Doping effects were also demonstrated by N-doped PG-based FETs. The n-type behavior shown in FIG. 3D with the neutrality point shifted to negative gate voltage is consistently observed for devices on the same piece of N-doped PG. After keeping the N-doped PG-based FET devices under vacuum ($10^{-6}$ Torr) for 24 h, their neutrality point did not move to zero, indicative of the covalent bonding between carbon and nitrogen rather than just physisorption. Applicants envision that the dopant N atoms donate free electrons to graphene. Meanwhile, the N-doped graphene's mobility calculated from the N-doped FETs was about 1 order of magnitude lower than in PG. Due to the broken symmetry of the N-doped graphene's lattice structure, the N atoms act as scattering centers that suppress its mobility. Patterned hydrogenation on graphene already shows its band gap opening. Similarly, if the doping atoms are periodically dispersed in graphene's matrix, they cannot only tune the Fermi level of graphene, but tailor its band gap. However, in the present N-doped graphene, the ON/OFF ratio does not increase, which suggests that the N atoms are randomly incorporated into the graphene matrix.

In conclusion, Applicants have demonstrated in the above study a one-step method for the controllable growth of both pristine graphene and doped graphene using non-gaseous carbon sources. This stands as a complementary method to CVD growth while permitting growth at more acceptable temperature ranges (i.e., lower temperatures). The Examples below provide additional information about the aforementioned study.

Utilized Equipment

Raman Spectroscopy was performed on a transferred graphene films on 100 nm Si/$SiO_2$ wafer with a Renishaw Raman microscope using 514-nm laser at ambient temperature. The electrical properties were measured in a probe station (Desert Cryogenic TT-probe 6 system) under vacuum ($10^{-5}$~$10^{-6}$ Torr). The IV data were collected by an Agilent 4155C semiconductor parameter analyzer. The HRTEM images were taken using a 2100F Field Emission Gun Transmission Electron Microscope with graphene samples directly transferred on a C-flat TEM grid (Protochips, Inc.). XPS was performed on a PHI Quantera SXM scanning X-ray microprobe with 45° takeoff angle and a 100 μm beam size.

PG Growth and Transfer

200 μL PMMA (MicroChem Corp. 950 PMMA A4, 4% in anisole) solution was deposited on a 25 μm thick Cu foil (Alfa Aesar, item No. 13382, cut to 1 cm×1 cm squares) by spin coating at 5000 rpm for 1 min. The obtained PMMA/Cu film was cured at 180° C. for 1 min and then dried in a vacuum oven at 70° C. for 2 h to remove the solvent. A typical process for thermally converting the PMMA films to monolayer graphene was: (1) evacuate a standard 1-inch quartz tube furnace to 100 mTorr and maintain the temperature at 1000° C.; (2) introduce the PMMA/Cu film into the furnace and anneal it under the $H_2$ (50 sccm) and Ar (500 sccm) flow for 10-20 min, maintaining the total pressure <30 Torr; and (3) cool the Cu foil with the graphene to room temperature under a $H_2$/Ar atmosphere. Then temperature could also be changed from 1000° C. to 800° C.

To transfer high-quality graphene films to Si/$SiO_2$ substrates, the same procedure was used that was developed to transfer graphene films for high performance transparent conductive electrodes, except that Marble's reagent ($CuSO_4$: HCl:$H_2O$::10 g:50 mL:50 mL) was used as the etchant. See Kim, K. S. et al., *Large-scale pattern growth of graphene films for stretchable transparent electrodes*. Nature 457, 706 (2009). The graphene film was recovered from the graphene/Cu foil by (1) spin-coating a PMMA layer (200 μL, 3000 rpm for 1 min) onto the graphene film; (2) etching Cu foil with Marble's reagent for 2 h and lifting off the PMMA/graphene film; (3) submerging a clean glass substrate into the etchant, picking up the floating film and transferring it into deionized (DI) water for 10 min (3 times) to remove the etchant ions; (4) dipping a new substrate into the deionized water and picking up the film; (5) vacuum drying the film on the substrate at 70° C. for 2 h to remove the water; (6) rinsing the film with acetone twice to remove the PMMA layer; and (7) drying the graphene film with blowing $N_2$ gas.

N-Doped Graphene Growth 100 mg melamine (Acros Organics, 98%) was dissolved into 10 mL 4% PMMA anisole solution to prepare the precursor for the N-doped graphene. 200 μL of the precursor solution was spin-coated on the catalyst surface at 5000 rpm for 1 min. The obtained films were cured at 180° C. for 1 min and then dried in a vacuum oven at 70° C. for 2 h to remove the solvent. The films were heated in a tube furnace at 1000° C. for 10 min at atmospheric pressure with a flow of $H_2$ (100 sccm) and Ar (500 sccm) to grow the doped graphene atop the catalyst substrate. The transfer of the N-doped graphene to the $Si/SiO_2$ surface is the same as the procedure used to transfer pristine graphene.

Figure 4:
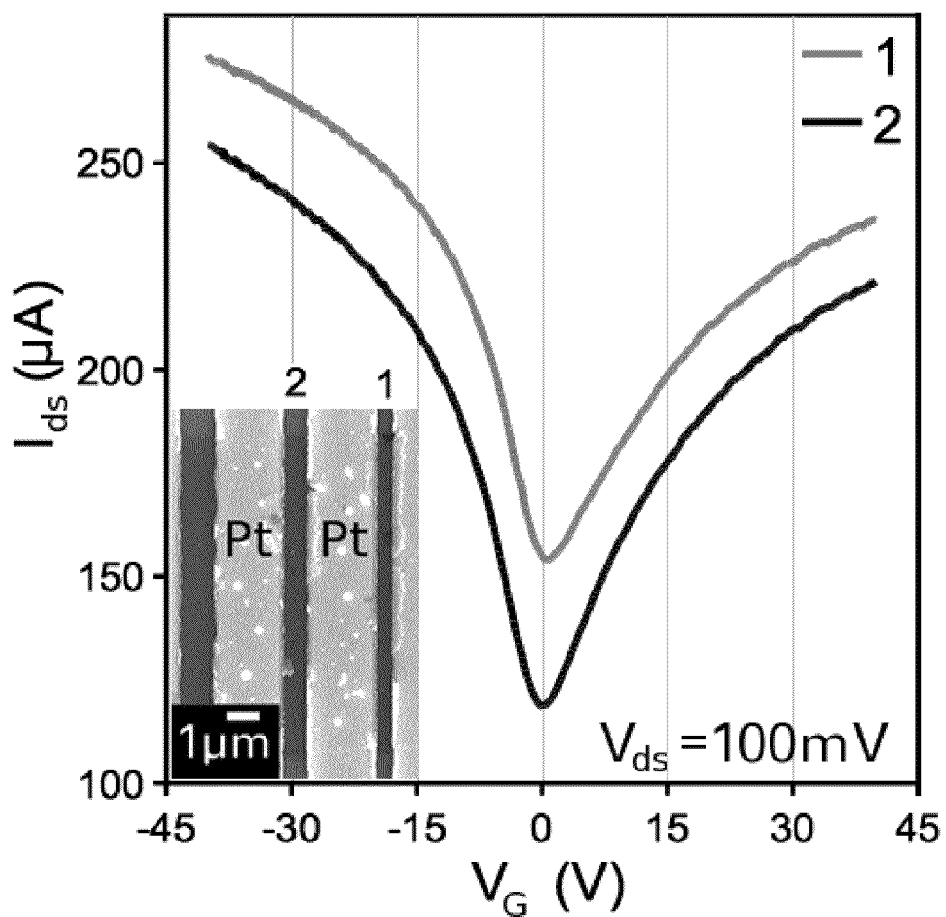
FIG. 4 shows two representative pristine graphene FETs atop 200 nm $SiO_2$ with highly doped $p^{++}$ Si back gate measured after storage at $10^{-6}$ Torr for 7 days. Under vacuum, the Dirac point recovers from positive gate voltages and stabilizes at zero as surface adsorbents are removed. Mobilities of ~400 $cm^2V^{-1}s^{-1}$ at room temperature were achieved.

Fabrication Procedure for FET Devices (Shown in FIG. 4)

PG was deposited on a highly doped $p^{++}$ substrate with 200 nm thermal oxide. A PMMA mask on top of the graphene was defined by conventional electron beam lithography. In the exposed areas, PG was removed by reactive ion etching with $O_2$/Ar flow (flow rate ratio of 1:2 and a total flow rate of 35 sccm) for 30 s at room temperature. The PMMA mask was removed with acetone to reveal undamaged PG stripes. Pt electrodes were defined by e-beam lithography.

Example 2

Growth of Graphene from Raw Carbon Sources

In this work, Applicants have developed a less expensive approach of growing graphene films by using six easily obtained, low or negatively valued raw carbon sources without pre-purification (cookies, chocolate, grass, plastics, roaches, and dog feces) to grow graphene directly on the backside of a Cu foil at 1050° C. under $H_2$/Ar flow. The non-volatile pyrolyzed species were easily removed by etching away the frontside of the Cu. Analysis by Raman spectroscopy, X-ray photoelectron spectroscopy, ultraviolet-visible spectroscopy and transmission electron microscopy indicates that the monolayer graphene derived from these carbon sources is of high quality.

Specifically, Applicants demonstrate in this Example that much less expensive carbon sources, such as food, insects and waste, can be used without purification to grow high-quality monolayer graphene directly on the backside of Cu foils under the $H_2$/Ar flow. For food, a Girl Scout cookie and chocolate were investigated. For waste with low or negative monetary value, Applicants used bulk polystyrene plastic, a common solid waste, blades of grass and dog feces. For insects, another often negative value carbon source, a cockroach leg was used. Growing high-quality graphene from these raw carbon sources opens a new way to convert the raw carbon into a high-value-added product, as graphene is one of the most expensive materials in the world.

Without being bound by theory, Applicants propose a possible purification and growth mechanism. For instance, it is envisioned that the graphene film forms as solid carbon sources decompose and diffuse to the backside of the Cu foil, leaving the other elemental residues on the original side. Using this procedure, only high quality pristine graphene with few defects and ~97% transparency was grown on the backside of the Cu foil, as confirmed by Raman and UV-Vis spectroscopy. No heteroatoms were detected in the monolayer graphene according to X-ray photoelectron spectroscopy (XPS), suggesting its pristine nature. Analysis by selected area diffraction pattern (SAED) in transmission electron microscopy (TEM) confirms the hexagonal lattice structure of the graphene.

Figure 11:
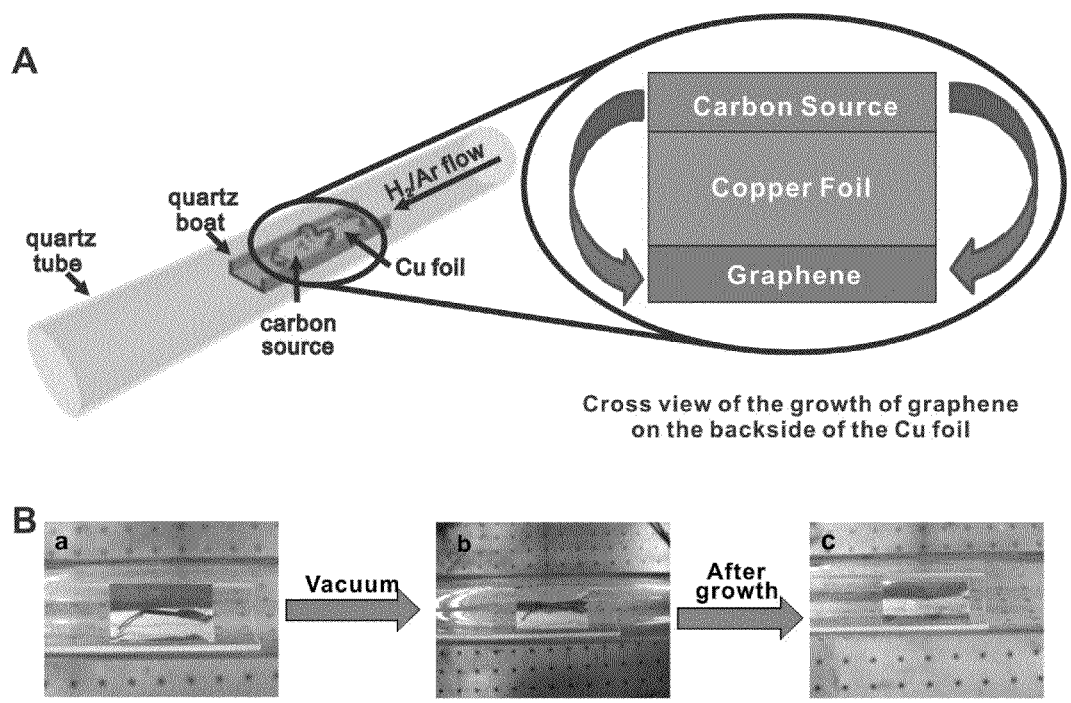
FIG. 11 illustrates the growth of graphene films from raw carbon sources.

In a typical growth experiment, as shown in FIG. 11, 10 mg of the dry carbon source was placed atop a Cu foil, and the foil was introduced into a 1050° C. tube furnace. The sample was annealed for 15 min under low pressure with $H_2$ and Ar at a flow rate of 100 $cm^3$ STP $min^{-1}$ and 500 $cm^3$ STP $min^{-1}$, respectively. For the grass and dog feces, the samples were heated in a 65° C. vacuum (102 Torr) oven for 10 h to remove excess moisture. The experimental setup and procedures are similar to the method used to grow PMMA-derived graphene, as illustrated in Example 1. A difference in this work is that the high quality monolayer graphene only forms on the backside of Cu foil, while the PMMA-derived graphene derived from Example 1 grows on both sides of the Cu foil.

Figure 12:
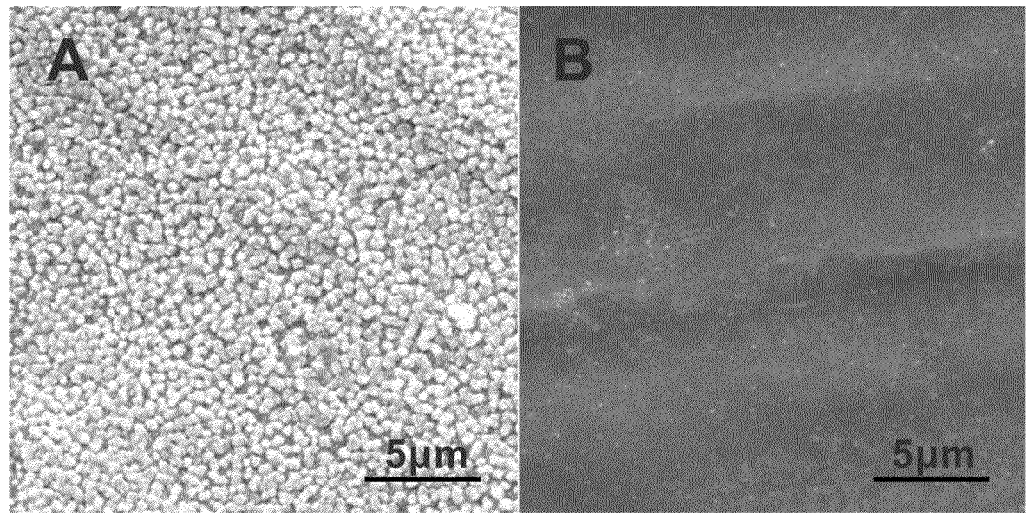
FIG. 12 shows scanning electron microscopy (SEM) images of the Cu foil after growth of graphene films from a GIRL SCOUT cookie.
Figure 13:
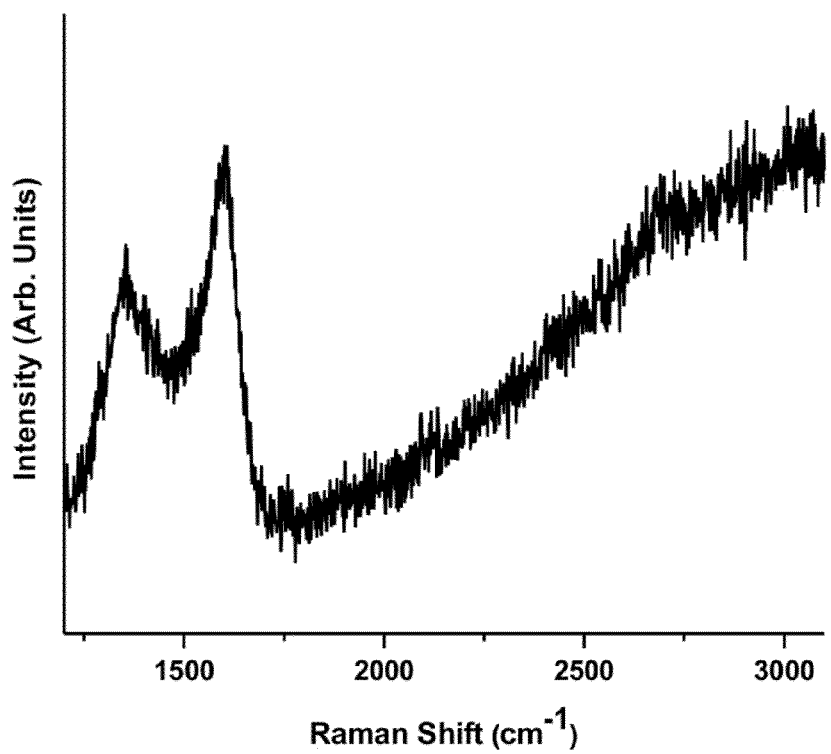
FIG. 13 shows a representative Raman spectrum of amorphous carbon grown on the backside of Cu foil when the GIRL SCOUT cookie fragments were placed 5 cm ahead of the Cu foil in the tube furnace shown in FIGS. 11A-B.

Since the carbon sources contain non-carbon elements, non-volatile residue may remain on the Cu foil after annealing. FIG. 12 shows SEM images of both sides of the Cu foil after a growth experiment. On the original frontside, many residual particles were found, as shown in FIG. 12A, while almost no particles were observed on the backside of the Cu foil where the graphene is formed (FIG. 12B). In FIG. 11B, photographic images of different growth stages are shown. A black residue is present after the growth in FIG. 11B(c). Based on the experimental evidence during the growth, most of the carbon segments from the decomposition of the solids are carried away as gases by the $H_2$/Ar flow. However, a portion of the carbon source diffuses to the backside of the Cu foil, forming a monolayer graphene film. It is not known whether the diffusion is through the Cu foil or via the edges. As a comparison experiment, if the solid carbon sources were placed 5 cm ahead of the Cu substrate (but still in the quartz boat) and both were introduced into the hot furnace at the same time, only amorphous carbon formed on both sides of the Cu foil. The representative Raman spectrum of the film displays a large D peak, as shown in FIG. 13.

Figure 14:
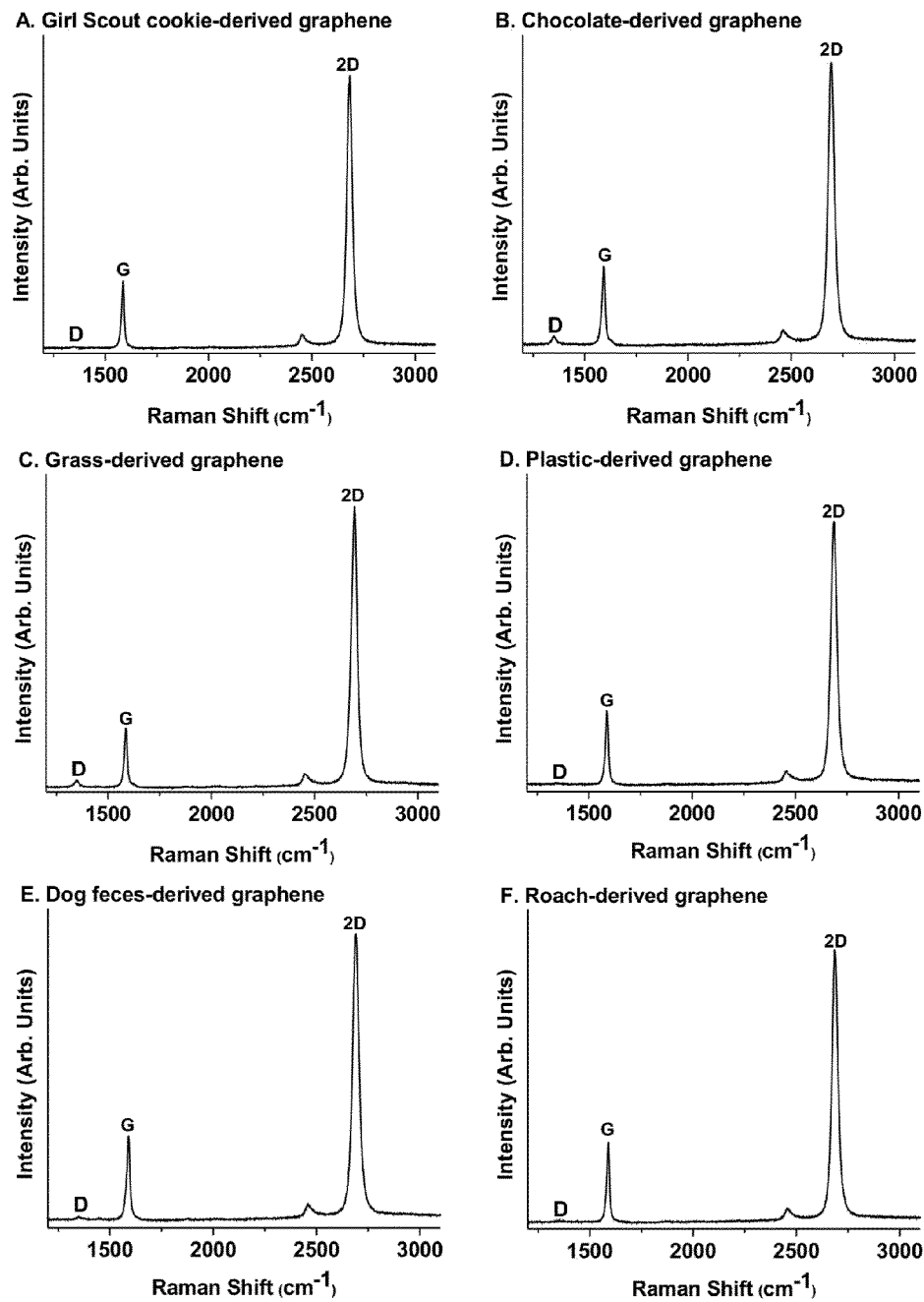
FIG. 14 shows Raman spectra of monolayer graphene films from six different carbon sources. The Raman spectra graphene were derived from GIRL SCOUT cookies (FIG. 14A); chocolate (FIG. 14B); grass (FIG. 14C); plastic (polystyrene Petri dish) (FIG. 14D); dog feces (FIG. 14E) and a cockroach leg (FIG. 14F). There was only a trace D peak in some of the spectra, and the 2D to G peak intensity ratios were ~4, indicating monolayer graphene.

After the monolayer graphene samples on the backside of the Cu foil were transferred onto a 100 nm $SiO_2$/Si wafer using standard protocols, the product was analyzed using Raman spectroscopy at 514 nm laser excitation. As shown in FIG. 14, all of the graphene samples grown have small or no D peaks in their Raman spectra, an indication of few graphene defects. The large 2D/G ratio suggests that it is high quality monolayer graphene. The exact G and 2D peak positions and their full-width at half-maximum (FWHM) for each spectrum were measured. The results are summarized Table 1.

TABLE 1

The wavelength number of the G and 2D peak, and their FWHM for graphene samples derived from six different carbon sources

| Carbon source | G peak (cm−1) | G peak FWHM (cm−1) | 2D peak (cm−1) | 2D peak FWHM (cm−1) |
|---|---|---|---|---|
| Cookie | 1585.5 | 14.1 | 2682.6 | 32.0 |
| Chocolate | 1591.4 | 15.9 | 2693.9 | 32.6 |
| Grass | 1585.7 | 16.0 | 2692.1 | 33.1 |
| Plastic | 1587.7 | 15.8 | 2685.7 | 34.8 |
| Dog feces | 1589.6 | 16.3 | 2689.7 | 35.1 |
| Roach | 1588.4 | 14.6 | 2687.4 | 33.5 |

Figure 15:
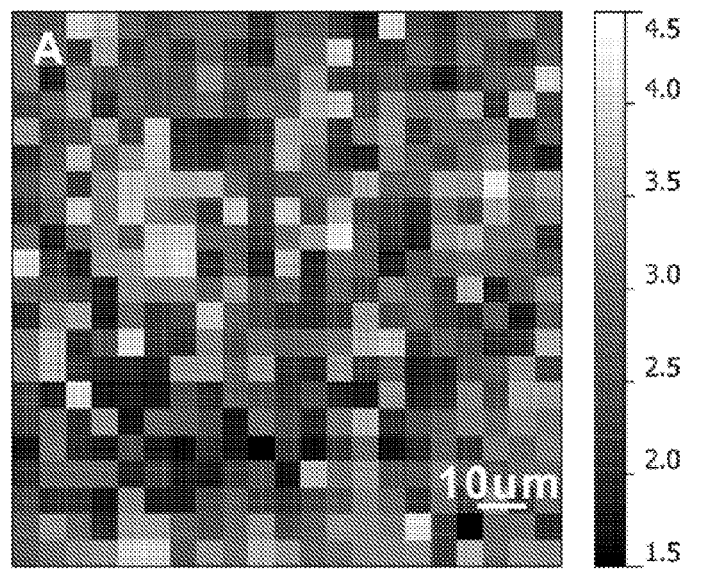
FIG. 15 shows Raman spectral mapping of graphene films from dog feces. The scanning was performed at every 5 $\mu m$ over an area of 100 $\mu m \times 100$ $\mu m$.
Figure 15:
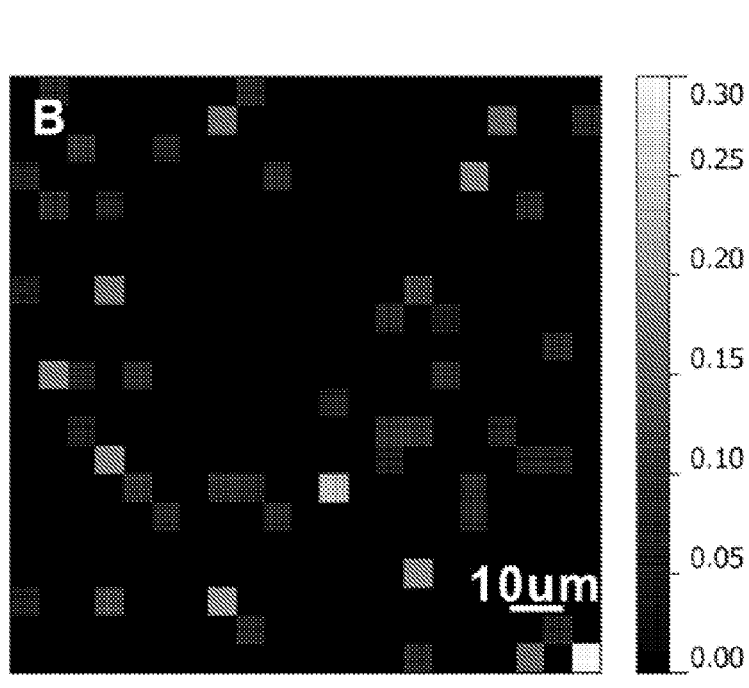

The G and 2D peaks are located at 1585.5-1591.4 cm$^{-1}$ and 2682.6-2693.9 cm$^{-1}$, respectively. The FWHM of the G peak and 2D peak are 14.1-16.3 cm$^{-1}$ and 32.0-35.1 cm$^{-1}$, respectively. In order to investigate the uniformity of the graphene film, a Raman mapping over a 100×100 μm$^2$ area (graphene derived from dog feces) was acquired. Over 95% of the scanned area had a signature of $I_{2D}/I_G$>1.8 and $I_D/I_G$<0.1, which further demonstrated the high quality of the monolayer graphene, as shown in FIG. 15.

Figure 16:
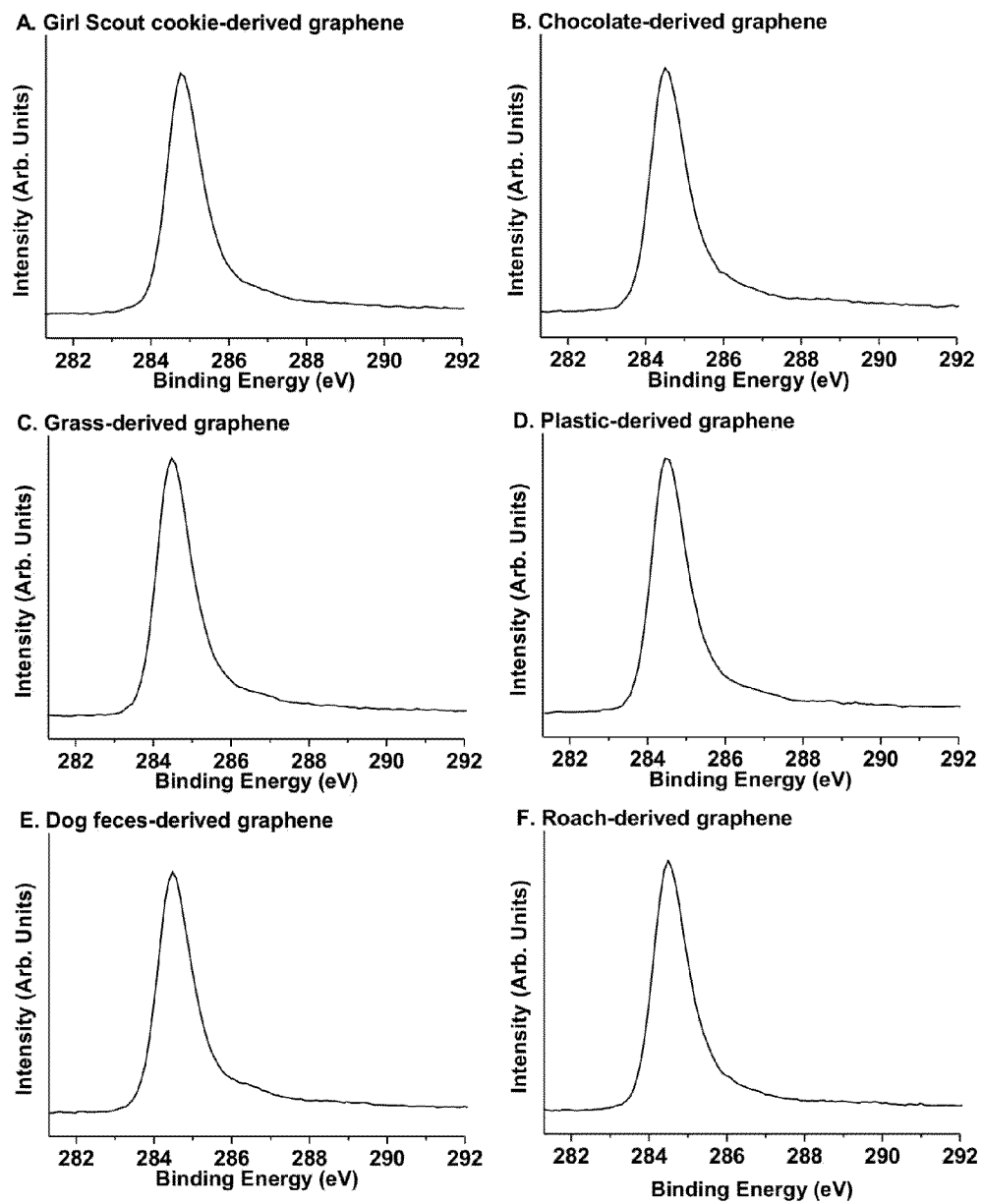
FIG. 16 shows x-ray photoelectron spectroscopy (XPS) spectra of graphene films from six raw carbon sources. The C1s XPS spectra of the randomly selected detection spots on graphene films were derived from the various raw carbon sources.

|XPS analysis of the graphene films was performed to confirm the elemental composition and the chemical environment of the C atoms. In FIG. 16, only a sharp peak at 284.5 eV with an asymmetric tailing towards high bonding energy is observed for C1s peak, suggesting a sp$^2$ graphitic peak. The FWHM was ~1.1 eV for each C1s peak. Although the raw carbon sources contain other elements such as oxygen, nitrogen, iron, sulfur, or phosphorus, the obtained graphene consisted of carbon, with none of these other elements found in the XPS survey spectra, confirming the graphene's pristine composition.

In the growth system, the H$_2$ gas might act as both a reducing reagent and a carrier gas. Since carbon is the most abundant element in these materials and graphene is the most thermodynamically stable form of carbon, only pristine graphene forms on the Cu. According to the C—C bond length (0.142 nm) in the hexagonal lattice of graphene, the surface area of one side of a monolayer of graphene is about 1315 m$^2$/g. Theoretically, it only takes 228 ng of carbon to cover one side of a 2 cm×3 cm Cu foil with monolayer graphene. In the growth system, the size of the graphene is ultimately limited by the size of the tube furnace, which limits the size of the Cu substrate that can be used. With a larger furnace, larger-sized graphene could be produced with 10 mg of the carbon source. Therefore, the limiting reagent in this Example is the Cu foil, though scrolled Cu foil could provide enhanced surface areas.

Figure 17:
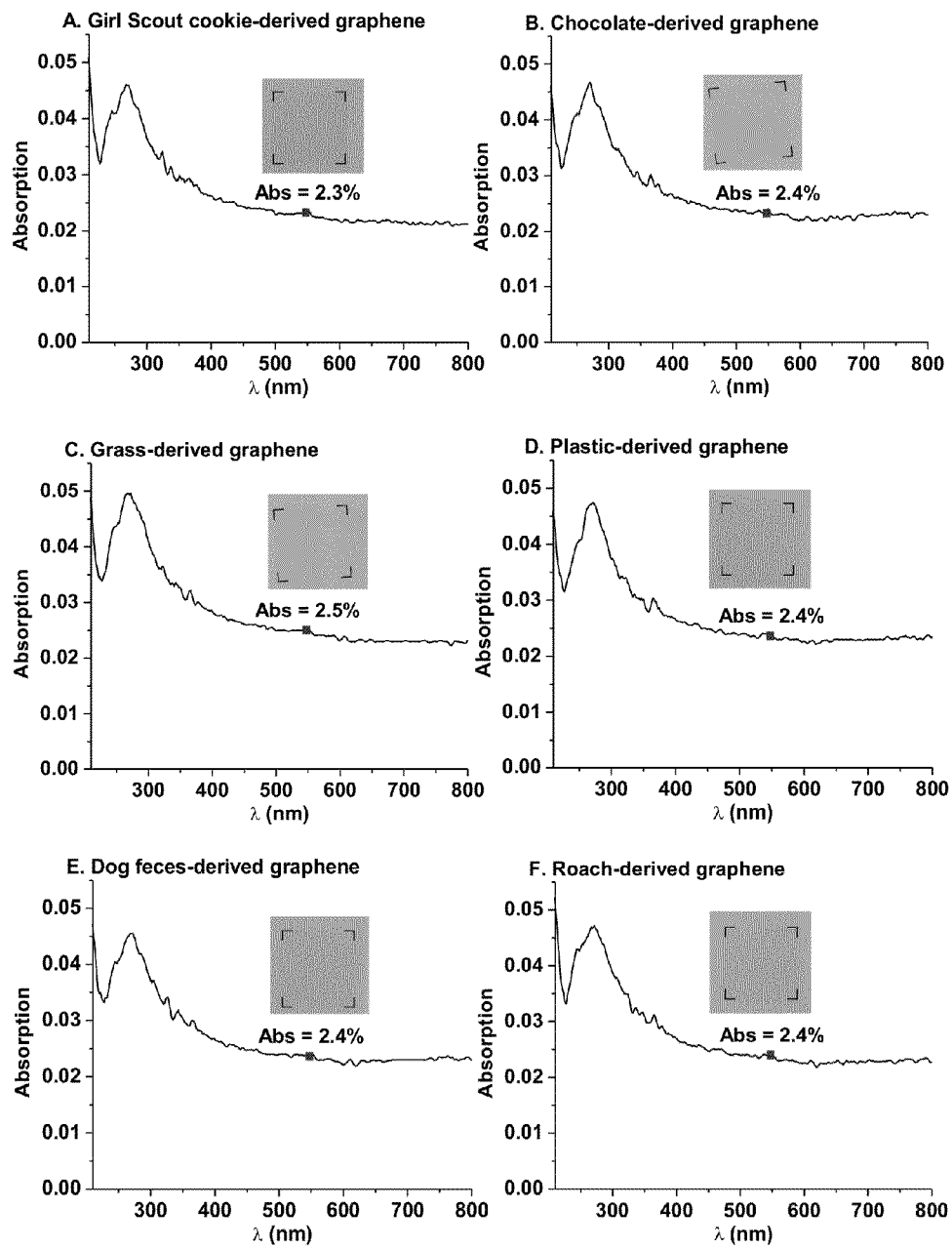
FIG. 17 shows UV-Vis spectra of graphene films derived from six carbon sources. The absorbance of each monolayer graphene film at 550 nm is approximately (2.4%±0.1%). On the right top of each spectrum is the photographic image of the monolayer graphene film of ~1 cm×1 cm in size on a 1-mm-thick quartz slide, labeled with a dashed square.
Figure 18:
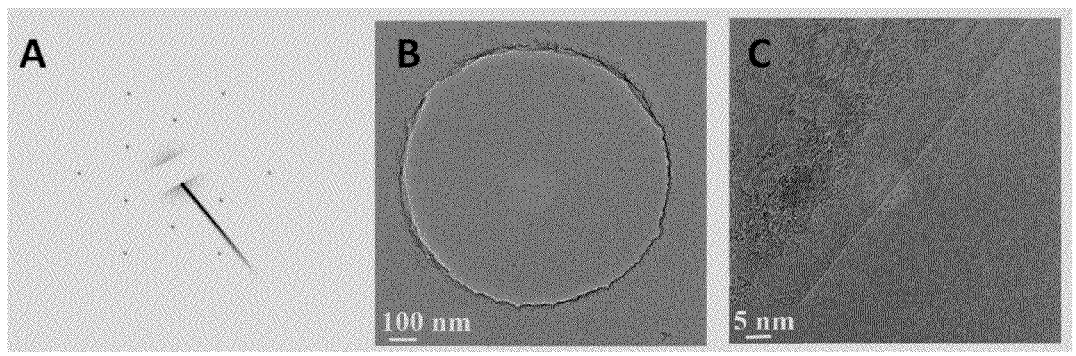
FIG. 18 shows diffraction pattern and transmission electron microscopy (TEM) images of a cookie-derived graphene film.
Figure 19:
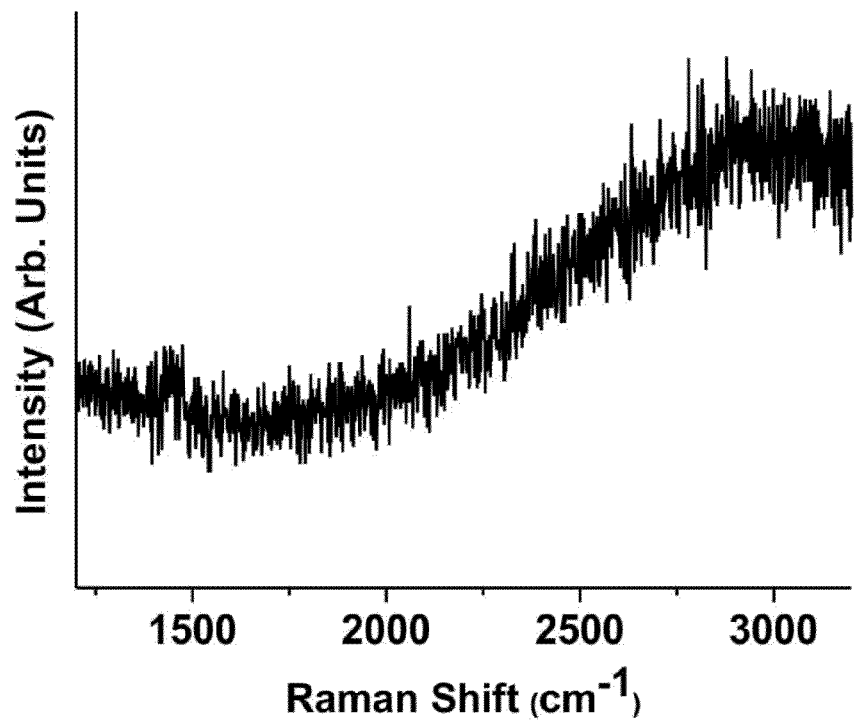
FIG. 19 shows Raman spectrum of a control sample. The annealing conditions are the same as the growth conditions described in Example 2, except that there is no solid carbon source added to the growth system. As shows in the spectrum, no graphene film was present on the backside of the Cu foil in the control sample.

All the graphene films were transferred to quartz slides before UV-Vis analysis. In the spectra, each graphene film exhibits a peak at 268 nm, a typical π→π* transition for the aromatic C—C bond in graphene, and the typical (2.4%±0.1%) absorption at 550 nm corresponding to the monolayer nature of graphene, as shown in FIG. 17. In the photographic images, the graphene films on quartz slides are uniform and transparent. Also, the sheet resistance ($R_s$) of the graphene was in the range of 1.5-3.0 kΩ/square by the four-probe method.

Six different carbon sources were used: GIRL SCOUT Cookie (shortbread flavor), chocolate (Chocolate Kennedy Half Dollar Gold Coins), grass (Ophiopogon picked at Rice University), plastic (Fisherbrand polystyrene Petri dishes, catalog #08-757-12), dog feces (Miniature Dachsund) and a cockroach leg (American cockroach caught in a house). The grass and the dog feces were dehydrated in a vacuum oven (102 Torr) at 65° C. for 10 h before being used in the growth process.

In sum, Applicants have demonstrated in this Example a general method to grow high-quality graphene from various raw carbon materials at 1050° C. under vacuum and H$_2$/Ar flow. The carbon sources were foods (cookie and chocolate), waste (grass, plastic, dog feces) and insect-derived. With this technique, many kinds of solid materials that contain carbon can potentially be used without purification as the feedstocks to produce high-quality graphene without pre-purification. Furthermore, through this method, low-valued foods and negative-valued solid wastes are successfully transformed into high-valued graphene which brings new solutions for recycling of carbon from impure sources.

Growth and Transfer of Graphene Samples

Six different carbon sources were used: Girl Scout Cookie (shortbread flavor), chocolate (Chocolate Kennedy Half Dollar Gold Coins), grass (Ophiopogon picked at Rice University), plastic (Fisherbrand polystyrene Petri dishes, catalog #08-757-12), dog feces (Miniature Dachsund) and a cockroach leg (American cockroach caught in a house). The grass and the dog feces were dehydrated in a vacuum oven (102 Torr) at 65° C. for 10 h before being used in the growth process.

The CVD system was evacuated to 10 mTorr for 10 h before growth. For the growth of graphene, 10 mg of a carbon source was placed atop the Cu foil (99.8% purity) and annealed at 1050° C. for 15 min with Ar flow at 500 cm$^3$ STP min$^{-1}$ and H$_2$ flow at 100 cm$^3$ STP min$^{-1}$. The system was then fast cooled (moved to the cool zone using a magnetic transfer rod) to room temperature under the H$_2$/Ar flow. A 100 nm-thick PMMA film was deposited on the backside of the foil using a 4% PMMA anisole solution spin-coated at 3000 rmp for 40 s. The frontside of the Cu foil was etched away by floating the foil metal-down on an acidic CuSO$_4$ solution (made with CuSO$_4$.5H$_2$O (15.6 g), con. HCl (50 mL), H$_2$O (50 mL) and H$_2$SO$_4$ (2 mL)) for ~5 s, then dipping the foil in DI water. This process was repeated at least two times in order to wash away the residue left on the frontside of the Cu foil. If the water washes did not remove the residue from the front side of the Cu foil, a Chemwipe was used to carefully brush the residue away before all of the Cu was removed. The PMMA-coated graphene was transferred to different substrates, such as 100 nm SiO$_2$/Si wafers and quartz. After the film was completely dried in a vacuum oven at 65° C. for 2 h, the film was rinsed with acetone 3× before characterization.

Characterization

Raman spectra were obtained by the single scan generated by the WiRE spectral acquisition wizard using a 514.5 nm laser in a Renishaw Raman RE02 microscope. UV-Vis spectroscopy was done using a 1-mm-thick quartz slide on which the sample was placed in a Shimadzu UV-3101 system. The XPS were obtained using a 100 μm X-ray beam of the 45° take-off angle and 26.00 eV pass energy in a PHI Quantera SXM scanning X-ray microprobe system. TEM imaging was obtained in a 2100F field emission gun transmission electron microscope. The graphene samples were transferred to a C-flat TEM grid (Protochips).

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the preferred embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of forming a graphene film, wherein the method comprises:
   a. depositing a non-gaseous carbon source onto a catalyst surface;
   b. exposing the non-gaseous carbon source to at least one gas, wherein the at least one gas comprises a gas flow rate; and
   c. initiating the conversion of the non-gaseous carbon source to the graphene film, wherein the formed graphene film comprises one or more layers of graphene, and wherein the thickness of the graphene film is controllable by adjusting the gas flow rate.

2. The method of claim 1, wherein the catalyst surface comprises one or more atoms selected from the group consisting of Ni, Co, Fe, Pt, Au, Al, Cr, Cu, Mg, Mn, Mo, Rh, Si, Ta, Ti, W, U, V, Zr and combinations thereof.

3. The method of claim 1, wherein the catalyst surface is a porous surface.

4. The method of claim 1, wherein the catalyst surface is a solid surface.

5. The method of claim 1, wherein the catalyst surface is a copper foil.

6. The method of claim 1, wherein the non-gaseous carbon source is selected from the group consisting of polymers, non-polymeric carbon sources, raw carbon sources, small molecules, organic compounds, fullerenes, fluorenes, carbon nanotubes, phenylene ethynylenes, sucrose, sugars, polysaccharides, carbohydrates, proteins, and combinations thereof.

7. The method of claim 1, wherein the non-gaseous carbon source is a polymer selected from the group consisting of poly(methyl methacrylate)s, polystyrenes, polyacrylonitriles, polycarbonates, poly(phenylene ethynylene)s, cellulose, and combinations thereof.

8. The method of claim 1, wherein the non-gaseous carbon source is poly(methyl methacrylate).

9. The method of claim 1, wherein the non-gaseous carbon source comprises a raw carbon source.

10. The method of claim 9, wherein the raw carbon source is selected from the group consisting of food sources, plants, insects, waste products, and combinations thereof.

11. The method of claim 1, wherein the depositing of the non-gaseous carbon source comprises at least one of spin-coating, drop-casting, spray coating, dip coating, physical application, vapor-coating, sublimation, blading, inkjet printing, screen printing, direct placement, or thermal evaporation.

12. The method of claim 1, wherein the initiating step occurs under vacuum.

13. The method of claim 1, wherein the initiating step comprises heating.

14. The method of claim 13, wherein the heating occurs at a reaction temperature between about 400° C. to about 1200° C.

15. The method of claim 13, wherein the heating occurs at a reaction temperature of about 800° C.

16. The method of claim 13, wherein the heating occurs in a reductive environment.

17. The method of claim 1, wherein the non-gaseous carbon source is doped with a doping reagent before, during or after the initiating step, and wherein the doping results in the formation of a doped graphene film.

18. The method of claim 17, wherein the doping reagent is selected from the group consisting of melamines, boranes, carboranes, aminoboranes, ammonia boranes, phosphines, aluminum hydroxides, silanes, polysilanes, polysiloxanes, phosphites, phosphonates, sulfides, thiols, ammonia, pyridines, phosphazines, borazines, and combinations thereof.

19. The method of claim 17, wherein the doping reagent is added to the non-gaseous carbon source as a gas during the conversion of the non-gaseous carbon source.

20. The method of claim 1, further comprising a step of adjusting the thickness of the graphene film by adjusting the gas flow rate.

21. The method of claim 1, wherein the at least one gas is selected from the group consisting of nitrogen, hydrogen, argon, and combinations thereof.

22. The method of claim 1, wherein the non-gaseous carbon sources are exposed to a plurality of gases, wherein each of the plurality of gases have individual flow rates, and wherein the thickness of the graphene film is controllable by the individual flow rates.

23. The method of claim 22, further comprising a step of adjusting the thickness of the graphene film by adjusting the individual gas flow rates.

24. The method of claim 1, wherein the non-gaseous carbon source is deposited on a first surface of the catalyst, and wherein the graphene film forms on a second surface of the catalyst.

25. The method of claim 24, wherein the first surface and the second surface are on opposite sides of the catalyst.

26. The method of claim 1, wherein the non-gaseous carbon source is deposited on a first surface of the catalyst, and wherein the graphene film forms on the first surface and a second surface of the catalyst.

27. The method of claim 26, wherein the first surface and the second surface are on opposite sides of the catalyst.

28. The method of claim 1, wherein the formed graphene film comprises pristine graphene.

29. The method of claim 1, wherein the formed graphene film is a monolayered graphene.

30. The method of claim 1, wherein the graphene film has from about 2 layers of graphene to about 9 layers of graphene.

* * * * *